United States Patent
Jin

(10) Patent No.: US 12,432,598 B2
(45) Date of Patent: Sep. 30, 2025

(54) GAP-FREE MEASUREMENT METHOD AND APPARATUS

(71) Applicant: Huawei Technologies Co., Ltd., Guangdong (CN)

(72) Inventor: Le Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 475 days.

(21) Appl. No.: 17/995,252

(22) PCT Filed: Mar. 11, 2021

(86) PCT No.: PCT/CN2021/080270
§ 371 (c)(1),
(2) Date: Sep. 30, 2022

(87) PCT Pub. No.: WO2021/197019
PCT Pub. Date: Oct. 7, 2021

(65) Prior Publication Data
US 2023/0247460 A1    Aug. 3, 2023

(30) Foreign Application Priority Data

Apr. 3, 2020 (CN) .......................... 202010259696.5
Jan. 22, 2021 (CN) .......................... 202110091110.3

(51) Int. Cl.
*H04W 24/10* (2009.01)
*H04B 7/0413* (2017.01)
(Continued)

(52) U.S. Cl.
CPC .......... *H04W 24/10* (2013.01); *H04B 7/0413* (2013.01); *H04W 24/08* (2013.01); *H04W 72/0453* (2013.01)

(58) Field of Classification Search
CPC . H04W 24/10; H04W 24/08; H04W 72/0453; H04W 36/0085; H04W 8/24;
(Continued)

(56) References Cited

U.S. PATENT DOCUMENTS 8,750,807 B2 * 6/2014 Lin ...................... H04W 24/10
                                                              455/67.11
9,253,670 B2 * 2/2016 Kim ..................... H04B 7/0413
(Continued)

FOREIGN PATENT DOCUMENTS

CN    101064899 A    10/2007
CN    110431797 A    11/2019
(Continued)

OTHER PUBLICATIONS

NTT Docomo, Inc., Offline summary for AI 7.3.3.4 UL data transmission procedure , 3GPP TSG RAN WG1 NR Ad Hoc Meeting R1-1801080 , Vancouver, Canada, Jan. 22-26, 2018, 33 pages.
(Continued)

*Primary Examiner* — Brian T O Connor
(74) *Attorney, Agent, or Firm* — WOMBLE BOND DICKINSON (US) LLP

(57) ABSTRACT

A gap-free measurement method is as follows: A terminal device receives, from an access network device, configuration information used to indicate the terminal device to perform gap-free measurement on a neighboring cell of a serving cell of the terminal device. The terminal device determines, based on the configuration information, radio frequency channels of a resource unit to be measured in the neighboring cell are some or all of radio frequency channels of a second resource unit, where the second resource unit is included in a first resource unit combination, and the first resource unit combination is included in a resource unit
(Continued)

combination that is configured for the terminal device and in an active state. The terminal device performs gap-free measurement on a first cell on some or all of radio frequency channels of the second resource unit.

17 Claims, 9 Drawing Sheets

(51) Int. Cl.
*H04W 24/08* (2009.01)
*H04W 72/0453* (2023.01)

(58) Field of Classification Search
CPC ......... H04W 36/0088; H04W 36/0094; H04W 76/15; H04W 36/00; H04W 8/22; H04B 7/0413; H04B 7/0628
See application file for complete search history.

(56) References Cited

U.S. PATENT DOCUMENTS

| | | | |
|---|---|---|---|
| 10,412,614 B2* | 9/2019 | Tenny | H04L 5/0048 |
| 10,715,286 B2* | 7/2020 | Chen | H04L 5/0091 |
| 11,044,650 B2* | 6/2021 | Chen | H04W 76/27 |
| 11,765,574 B2* | 9/2023 | Dhanapal | H04W 72/0453 370/329 |
| 12,003,302 B2* | 6/2024 | Nimbalker | H04B 7/0628 |
| 12,035,419 B2* | 7/2024 | Wiemann | H04W 8/24 |
| 12,052,186 B2* | 7/2024 | Sun | H04W 8/24 |
| 12,081,296 B2* | 9/2024 | Li | H04W 72/21 |
| 2012/0178465 A1 | 7/2012 | Lin et al. | |
| 2017/0013623 A1* | 1/2017 | Chin | H04W 72/21 |
| 2018/0070250 A1* | 3/2018 | Venkataraman | H04W 48/08 |
| 2018/0076872 A1* | 3/2018 | Li | H04B 7/0626 |
| 2019/0124647 A1 | 4/2019 | Li | |

FOREIGN PATENT DOCUMENTS

| | | |
|---|---|---|
| CN | 110945904 A | 3/2020 |
| EP | 2739107 A1 | 6/2014 |
| WO | 2018175891 A1 | 9/2018 |

OTHER PUBLICATIONS

Nokia, Nokia Shanghai Bell, L3 CSI-RS based intra-f and inter-f measurement definition, 3GPP TSG RAN WG4 #94_e R4-2000656, 3GPP, Feb. 14, 2020.

Huawei et al: "On UE assistance information",3GPP Draft; R1-1909309, 3rd Generation Partnershipproject (3GPP), Mobile Competence Centre;650, Route Deslucioles;F-06921 Sophia-Antipolis Cedex;France,vol. RAN WG1 No. Prague, Czech Republic; Aug. 26, 2019-Aug. 30, 2019 Aug. 17, 2019 (Aug. 17, 2019), XP051765916, Retrieved from the Internet: URL:http://www.3gpp.org/ftp/tsg_ran/WG1_RL1/TSGR1_98/Docs/R1-1909309.zip[retrieved on Aug. 17, 2019].

Huawei, HiSilicon, On UE capabilities of FG2-36/2-40/2-41/2-43, 3GPP TSG RAN WG1#98b R1-1910418, 3GPP, Oct. 5, 2019 (reference for showing well-known technology).

ZTE, Further discussion on NR CGI reading with autonomous gaps, 3GPP TSG RAN WG4#94_e R4-2001273, 3GPP, Feb. 14, 2020 (reference for showing well-known technology).

* cited by examiner

GAP-FREE MEASUREMENT METHOD AND APPARATUS

CROSS-REFERENCE TO RELATED APPLICATIONS

This application is a National Stage of International Application No. PCT/CN2021/080270, filed on Mar. 11, 2021, which claims priority to Chinese Patent Application No. 202010259696.5, filed on Apr. 3, 2020, and Chinese Patent Application No. 202110091110.3, filed on Jan. 22, 2021. All of the aforementioned patent applications are hereby incorporated by reference in their entireties.

TECHNICAL FIELD

This application relates to the field of communications technologies, and in particular, to a gap-free measurement method and apparatus.

BACKGROUND

In mobile communication, measurement is a common and important process. For example, in a radio resource control (RRC)_connected (CONNECTED) state, when a terminal device needs to measure a neighboring cell of a serving cell, if measurement without a measurement gap is not supported, an accurate measurement gap needs to be configured for the terminal device, so that the terminal device measures the neighboring cell based on the measurement gap.

In the conventional technology, in the RRC_CONNECTED state, when the terminal device measures the neighboring cells of the serving cell of the terminal device based on the measurement gap, if the measurement gap configured by a base station does not include, due to asynchrony of the neighboring cells, some or all synchronization signals from the neighboring cells, for example, an SSB (synchronization signal block) in NR, the terminal device cannot measure some or all of the neighboring cells. If the terminal can support gap-free measurement, the terminal device can measure SSBs from the neighboring cells in a sufficiently long window, and can measure all of the neighboring cells. Therefore, how to ensure that the terminal device supports gap-free measurement becomes an urgent problem to be resolved.

SUMMARY

This application provides a gap-free measurement method and apparatus, to resolve a problem in the conventional technology that a terminal device cannot perform gap-free measurement on a neighboring cell because the terminal device has no radio frequency channel to receive a signal from the neighboring cell.

To achieve the foregoing objective, this application uses the following technical solutions:

According to a first aspect, a gap-free measurement method is provided. The gap-free measurement method includes: A terminal device receives, from an access network device, configuration information used to indicate the terminal device to perform gap-free measurement on a neighboring cell of a serving cell of the terminal device. The terminal device determines, based on the configuration information, some or all of radio frequency channels of a second resource unit are radio frequency channels of a resource unit to be measured in the neighboring cell of the serving cell of the terminal device, where the second resource unit is included resource units in a first resource unit combination that is configured for the terminal device and in an active state. The terminal device performs gap-free measurement on the neighboring cell of the serving cell of the terminal device on some or all of the radio frequency channels of the second resource unit.

Based on the gap-free measurement method provided in the first aspect, after the terminal device receives the configuration information used to indicate the terminal device to perform gap-free measurement on the neighboring cell of the serving cell of the terminal device, the terminal device can determine, based on the configuration information, that some or all of the radio frequency channels of the second resource unit in the resource units in the first resource unit combination that is configured for the terminal device and in the active state are the radio frequency channels of the resource unit to be measured in the neighboring cell of the serving cell. In this way, the terminal device can receive a signal from the neighboring cell on the radio frequency channels of the resource unit to be measured, so that the terminal device can perform gap-free measurement on the neighboring cell. This resolves a problem in the conventional technology that the terminal device cannot perform gap-free measurement on the neighboring cell because there is no radio frequency channel to receive the signal from the neighboring cell.

In an embodiment, with reference to the first aspect, the configuration information is further used to indicate a second resource unit combination and a multiple-input multiple-output (MIMO) capability of each resource unit in the second resource unit combination; and the second resource unit combination includes a first resource unit combination after update, and the first resource unit combination after the update does not include the second resource unit, or a MIMO capability of the second resource unit in the first resource unit combination after the update is lower than a MIMO capability of the second resource unit in the first resource unit combination before the update.

Based on this embodiment, the terminal device can accurately determine, based on the configuration information, the resource unit to be measured in the neighboring cell of the serving cell of the terminal device and the radio frequency channels of the resource unit to be measured, and the terminal device does not need to consume time to determine radio frequency channels of another resource unit to be measured. This reduces power consumption of the terminal device.

In an embodiment, with reference to any one of the first aspect or the embodiments of the first aspect, the terminal device sends, to the access network device, capability information including a capability of a resource unit combination supported by the terminal device and a MIMO capability of each resource unit in the resource unit combination supported by the terminal device.

Based on this embodiment, the terminal device sends the capability information of the terminal device to the access network, so that the access network device can determine, based on the capability information of the terminal device, the capability of the resource unit combination supported by the terminal device and the MIMO capability of each resource unit in the resource unit combination supported by the terminal device. This avoids the problem that the terminal device cannot perform gap-free measurement on the neighboring cell because a resource unit combination determined by the access network device is a resource unit combination that is not supported by the terminal device, or a MIMO capability of a resource unit in a resource unit combination determined by the access network device is greater than a MIMO capability of a resource unit supported by the terminal device.

In an embodiment, with reference to any one of the first aspect or the embodiments of the first aspect, the configuration information is further used to indicate at least one resource unit included in the first resource unit combination, and radio frequency channels of each resource unit included in the at least one resource unit can be used as the radio frequency channels of the first resource unit.

Based on this embodiment, the terminal device can obtain the radio frequency channels of the first resource unit from the configuration information sent by the access network device, to prevent the terminal device from selecting the radio frequency channels of the first resource unit from radio frequency channels of a resource unit in another resource unit combination, reduce a time consumed when the terminal device determines the radio frequency channels of the first resource unit.

In an embodiment, with reference to any one of the first aspect or the embodiments of the first aspect, the terminal device uses all of the radio frequency channels of the second resource unit that meets one or more of the following conditions in the at least one resource unit as the radio frequency channels of the first resource unit: The second resource unit is a resource unit with the largest identity (ID) in resource units in an active state; the second resource unit is a resource unit with the lowest data transmission rate in resource units in an active state; the second resource unit is a resource unit with the smallest reference signal received power (RSRP), reference signal received quality (RSRQ), signal to interference plus noise ratio (SINR), or rank indication (RI) in resource units in an active state; the second resource unit is a resource unit with the smallest bandwidth in resource units in an active state; and the second resource unit is a resource unit with the smallest MIMO capability in resource units in an active state.

Based on this embodiment, the terminal device can more accurately determine the second resource unit, so that the terminal device accurately uses all of the radio frequency channels of the second resource unit that meets the plurality of conditions as the radio frequency channels of the first resource unit. This improves accuracy of determining the radio frequency channels of the first resource unit by the terminal device.

In an embodiment, with reference to any one of the first aspect or the embodiments of the first aspect, the terminal device uses some of the radio frequency channels of the second resource unit that meets one or more of the following conditions in the at least one resource unit as the radio frequency channels of the first resource unit: The second resource unit is a resource unit whose RI is less than or equal to a preset value in resource units in an active state; the second resource unit is a resource unit with the smallest bandwidth in resource units in an active state; the second resource unit is a resource unit with the smallest RSRP, RSRQ, or SINR in resource units in an active state; the second resource unit is a resource unit with the lowest data transmission rate in resource units in an active state; and the second resource unit is a resource unit with the largest ID in resource units in an active state.

Based on this embodiment, the terminal device can more accurately determine the second resource unit, so that the terminal device accurately uses some of the radio frequency channels of the second resource unit that meets the plurality of conditions as the radio frequency channels of the first resource unit. This improves accuracy of determining the radio frequency channels of the first resource unit by the terminal device.

In an embodiment, with reference to any one of the first aspect or the embodiments of the first aspect, the terminal device sends, to the access network device, a configuration completion response used to indicate the second resource unit and/or a MIMO capability of the second resource unit.

Based on this embodiment, the terminal device sends, to the access network device, the configuration completion response used to indicate the second resource unit and/or the MIMO capability of the second resource unit, so that the access network device determines, based on the configuration completion response, the radio frequency channels of the resource unit to be measured in the neighboring cell of the serving cell of the terminal device. This avoids a problem that the terminal device is not synchronized with the access network device because the access network device sends a signal from the neighboring cell to the terminal device on radio frequency channels of another resource unit.

In an embodiment, with reference to any one of the first aspect or the embodiments of the first aspect, the terminal device continuously monitors a synchronization signal block (SSB) on the radio frequency channels of the first resource unit in a preset time greater than duration occupied by the SSB.

Based on this embodiment, the terminal device can continuously monitor the SSB from the neighboring cell in the preset time longer than the duration occupied by the SSB. This resolves the problem in the conventional technology that the terminal device cannot accurately measure the neighboring cell of the serving cell because the terminal device cannot detect the SSB from the neighboring cell or cannot detect all SSBs from the neighboring cell in a measurement gap.

In an embodiment, with reference to any one of the first aspect or the embodiments of the first aspect, the preset time is SMTC.

Based on this embodiment, on one hand, because the SMTC period is greater than or equal to the SSB period of the neighboring cell, the terminal device can detect SSBs of all the neighboring cells in the SMTC period. On the other hand, the terminal device is prevented from performing gap-free measurement on the neighboring cell by using relatively long measurement duration. This reduces power consumption of the terminal device.

In an embodiment, with reference to any one of the first aspect or the embodiments of the first aspect, when the radio frequency channels of the resource unit to be measured in the neighboring cell of the serving cell of the terminal device are some of the radio frequency channels of the second resource unit, the terminal device receives or sends uplink and downlink signals on the second resource unit by using a reduced MIMO capability.

Based on this embodiment, the terminal device can receive signals from the neighboring cell on some of the radio frequency channels of the second resource unit, and further, the terminal device can perform gap-free measurement on the neighboring cell. At the same time, the uplink and downlink signals can still be continuously received or sent on the second resource unit. This maintains data transmission.

In an embodiment, with reference to any one of the first aspect or the embodiments of the first aspect, when the radio frequency channels of the resource unit to be measured in the neighboring cell of the serving cell of the terminal device are all of the radio frequency channels of the second resource unit, the terminal device stops receiving or sending uplink and downlink signals on the second resource unit.

Based on this embodiment, the terminal device can receive signals from the neighboring cell on all of the radio frequency channels of the second resource unit, and further, the terminal device can perform gap-free measurement on the neighboring cell.

According to a second aspect, a gap-free measurement apparatus is provided. The gap-free measurement apparatus is used in a terminal device or a chip or a system-on-a-chip in the terminal device; or may be a functional module that is in the terminal device and configured to implement the method according to any one of the first aspect or the embodiments of the first aspect. The gap-free measurement apparatus may implement functions performed by the terminal device in the foregoing aspects or the possible designs, and the functions may be implemented by hardware executing corresponding software. The hardware or the software includes one or more modules corresponding to the functions. For example, the gap-free measurement apparatus includes a communication unit and a processing unit.

The communication unit is configured to receive, from an access network device, configuration information that is used to indicate the terminal device to perform gap-free measurement on a neighboring cell of a serving cell of the terminal device. The processing unit is configured to determine, based on the configuration information, that some or all of radio frequency channels of a second resource unit are radio frequency channels of a resource unit to be measured in the neighboring cell, where the second resource unit is included in resource units in a first resource unit combination that is configured for the terminal device and in an active state. The processing unit is further configured to perform gap-free measurement on the neighboring cell on some or all of the radio frequency channels of the second resource unit.

For a specific implementation of the gap-free measurement apparatus, refer to behavior and a function of the terminal device in the gap-free measurement method provided in any one of the first aspect or the embodiments of the first aspect. Details are not described herein again. Therefore, the provided gap-free measurement apparatus can achieve same beneficial effects as any one of the first aspect or the embodiments of the first aspect.

According to a third aspect, a gap-free measurement apparatus is provided. The gap-free measurement apparatus may be a terminal device or a chip or a system-on-a-chip in the terminal device. The gap-free measurement apparatus may implement functions performed by the terminal device in the foregoing aspects or possible designs. The functions may be implemented by hardware. For example, in a possible design, the gap-free measurement apparatus may include a processor and a communications interface. The processor is configured to run computer programs or instructions, to implement the gap-free measurement method described in any one of the first aspect or the embodiments of the first aspect.

In another possible design, the gap-free measurement apparatus may further include a memory. The memory is configured to store computer-executable instructions and data that are necessary for the gap-free measurement apparatus. When the gap-free measurement apparatus runs, the processor executes the computer-executable instructions stored in the memory, so that the gap-free measurement apparatus performs the gap-free measurement method according to any one of the first aspect or the embodiments of the first aspect.

According to a fourth aspect, a computer-readable storage medium is provided. The computer-readable storage medium may be a readable non-volatile storage medium. The computer-readable storage medium stores computer instructions or programs. When the computer instructions or programs are run on a computer, the computer is enabled to perform the gap-free measurement method according to any one of the first aspect or the embodiments of the foregoing aspect.

According to a fifth aspect, a computer program product including instructions is provided. When the computer program product runs on a computer, the computer is enabled to perform the gap-free measurement method according to any one of the first aspect or the embodiments of the foregoing aspect.

According to a sixth aspect, a gap-free measurement apparatus is provided. The gap-free measurement apparatus may be a terminal device or a chip or a system-on-a-chip in the terminal device. The gap-free measurement apparatus includes one or more processors and one or more memories. The one or more memories are coupled to the one or more processors, and the one or more memories are configured to store computer program code. The computer program code includes computer instructions. When the one or more processors execute the computer instructions, the terminal device is enabled to perform the gap-free measurement method according to any one of the first aspect or the embodiments of the first aspect.

According to a seventh aspect, a chip system is provided. The chip system includes a processor and a communications interface. The chip system may be configured to implement functions performed by the terminal device in any one of the first aspect or the embodiments of the first aspect, for example, the communications interface receives, from an access network device, configuration information that is used to indicate the terminal device to perform, on a first resource unit, gap-free measurement on a neighboring cell of a serving cell of the terminal device. In a possible design, the chip system further includes a memory. The memory is configured to store program instructions and/or data. The chip system may include a chip, or may include a chip and another discrete component. This is not limited herein.

For technical effects achieved by any one of the designs of the second aspect to the seventh aspect, refer to the technical effects achieved by any one of the first aspect or the embodiments of the first aspect. Details are not described again.

According to an eighth aspect, a gap-free measurement method is provided. The gap-free measurement method includes: An access network device determines that radio frequency channels of a resource unit to be measured in a neighboring cell of a serving cell of the terminal device are some or all of radio frequency channels of a second resource unit in resource units in a first resource unit combination that is configured for the terminal device and in an active state. The access network device sends to the terminal device, configuration information used to indicate the terminal device to perform gap-free measurement on the neighboring cell of the serving cell of the terminal device and used to indicate a second resource unit combination and a MIMO capability of each resource unit in the second resource unit combination. The second resource unit combination includes the first resource unit combination after update. The resource unit combination after the update does not include the second resource unit, or a MIMO capability of a second resource unit in the first resource unit combination after the update is lower than a MIMO capability of the second combination unit in the first resource unit combination.

Based on the gap-free measurement method provided in the eighth aspect, after determining the radio frequency channels of the resource unit to be measured in the neighboring cell of the serving cell of the terminal device, the access network device sends, to the terminal device, the configuration information used to indicate the terminal device to perform gap-free measurement on the neighboring cell of the serving cell of the terminal device and used to indicate the second resource unit combination and the MIMO capability of each resource unit in the second resource unit combination, so that the terminal device determines the radio frequency channels of the first resource unit based on the configuration information, and further, the terminal device can perform gap-free measurement on the neighboring cell on the radio frequency channels of the resource unit to be measured. This resolves a problem in the conventional technology that the terminal device cannot perform gap-free measurement on the neighboring cell because there is no radio frequency channel to receive a signal from the neighboring cell.

In an embodiment, with reference to any one of the eighth aspect or the embodiments of the eighth aspect, the access network device uses some of the radio frequency channels of the second resource unit that meets one or more of the following conditions as the radio frequency channels of the first resource unit: The second resource unit is a resource unit whose RI is less than or equal to a preset value in resource units in an active state; the second resource unit is a resource unit with the smallest bandwidth in resource units in an active state; the second resource unit is a resource unit with the smallest RSRP, RSRQ, or SINR in resource units in an active state; the second resource unit is a resource unit with the lowest data transmission rate in resource units in an active state; and the second resource unit is a resource unit with the largest ID in resource units in an active state.

Based on this embodiment, the access network device can provide the more accurate second resource unit for the terminal device, so that the terminal device accurately uses some of the radio frequency channels of the second resource unit that meets the plurality of conditions as the radio frequency channels of the first resource unit. This improves accuracy of determining the radio frequency channels of the first resource unit by the access network device.

In an embodiment, with reference to any one of the eighth aspect or the embodiments of the eighth aspect, the access network device uses all of the radio frequency channels of the second resource unit that meets one or more of the following conditions as the radio frequency channels of the first resource unit: The second resource unit is a resource unit with the largest ID in resource units in an active state; the second resource unit is a resource unit with the lowest data transmission rate in resource units in an active state; the second resource unit is a resource unit with the smallest RSRP, RSRQ, SINR, or RI in resource units in an active state; the second resource unit is a resource unit with the smallest bandwidth in resource units in an active state; and the second resource unit is a resource unit with the smallest MIMO capability in resource units in an active state.

Based on this embodiment, the access network device can provide the more accurate second resource unit for the terminal device, so that the terminal device accurately uses all of the radio frequency channels of the second resource unit that meets the plurality of conditions as the radio frequency channels of the first resource unit. This improves accuracy of determining the radio frequency channels of the first resource unit by the access network device.

In an embodiment, with reference to any one of the eighth aspect or the embodiments of the eighth aspect, when the access network device determines that a capability of a third resource unit combination is greater than a capability of a resource unit combination supported by the terminal device, or when the access network device determines that a MIMO capability of a third resource unit combination is greater than a MIMO capability of a resource unit combination supported by the terminal device, the access network device determines the radio frequency channels of the first resource unit based on capability information of the terminal device, where the third resource unit combination is a resource unit combination obtained after the first resource unit is added to the first resource unit combination.

Based on this embodiment, when the access network device determines that the capability of the resource unit combination obtained after the first resource unit is added to the first resource combination is greater than the capability of the resource unit combination supported by the terminal device, or when the MIMO capability of the resource unit combination obtained after the first resource unit is added to the first resource combination is greater than the MIMO capability of the resource unit combination supported by the terminal device, the access network device determines the radio frequency channels of the first resource unit based on the capability information of the terminal device. This avoids a problem that the terminal device cannot perform gap-free measurement on the neighboring cell of the serving cell on the radio frequency channels of the first resource unit because the capability of the resource unit combination that is determined by the access network device based on the capability information of the terminal device and that includes the first resource unit is greater than the capability of the resource unit combination supported by the terminal device, or the MIMO capability of the resource unit combination that includes the first resource unit is greater than the MIMO capability of the resource unit combination supported by the terminal device, and improves accuracy of performing, by the terminal device, gap-free measurement on the neighboring cell of the serving cell.

In an embodiment, with reference to any one of the eighth aspect or the embodiments of the eighth aspect, the access network device receives the capability information that includes the resource unit combination supported by the terminal device and a MIMO capability of each resource unit in the resource unit combination supported by the terminal device and that is from the terminal device.

Based on this embodiment, the access network device can obtain the capability information of the terminal device by exchanging conventional signaling with the terminal device, which is simple and easy to implement.

In an embodiment, with reference to any one of the eighth aspect or the embodiments of the eighth aspect, when the radio frequency channels of the resource unit to be measured in the neighboring cell of the serving cell of the terminal device are some of the radio frequency channels of the second resource unit, the access network device receives or sends uplink and downlink signals on the second resource unit by using a reduced MIMO capability.

Based on this embodiment, the access network device sends the uplink and downlink signals to the terminal device on the second resource unit by using the reduced MIMO capability. In this way, the terminal device can receive a signal from the neighboring cell by using some of the radio frequency channels of the second resource unit, so that the terminal device can perform gap-free measurement on the neighboring cell. At the same time, the uplink and downlink signals can still be continuously received or sent on the second resource unit. This maintains data transmission.

In an embodiment, with reference to any one of the eighth aspect or the embodiments of the eighth aspect, when the radio frequency channels of the first resource unit are all of the radio frequency channels of the second resource unit, the access network device stops receiving or sending uplink and downlink signals on the second resource unit.

Based on this embodiment, the access network device stops sending the uplink and downlink signals to the terminal device on the second resource unit. In this way, the terminal device can receive a signal from the neighboring cell by using the radio frequency channels of the second resource unit, so that the terminal device can perform gap-free measurement on the neighboring cell.

According to a ninth aspect, a gap-free measurement apparatus is provided. The gap-free apparatus is used in an access network device or a chip or a system-on-a-chip in the access network device, or may be a functional module that is in the access network device and that is configured to implement the method according to any one of the eighth aspect or the embodiments of the eighth aspect. The gap-free measurement apparatus may implement functions performed by the access network device in the foregoing aspects or the possible designs, and the functions may be implemented by hardware executing corresponding software. The hardware or the software includes one or more modules corresponding to the functions. For example, the gap-free measurement apparatus includes a communication unit and a processing unit.

The processing unit is configured to determine that radio frequency channels of a resource unit to be measured in a neighboring cell of a serving cell of a terminal device are some or all of radio frequency channels of a second resource unit in resource units in a first resource unit combination that is configured for the terminal device and in an active state.

The communication unit is configured to send to the terminal device, configuration information used to indicate the terminal device to perform gap-free measurement on the neighboring cell of the serving cell of the terminal device and used to indicate a second resource unit combination and a MIMO capability of each resource unit in the second resource unit combination. The second resource unit combination includes the first resource unit combination after update. The resource unit combination after the update does not include the second resource unit, or a MIMO capability of a second resource unit in the first resource unit after the update is lower than a MIMO capability of the second resource unit in the first resource unit.

According to a tenth aspect, a gap-free measurement apparatus is provided. The gap-free measurement apparatus may be a terminal device or a chip or a system-on-a-chip in the terminal device. The gap-free measurement apparatus may implement functions performed by the terminal device in the foregoing aspects or the possible designs. The functions may be implemented by hardware. For example, in a possible design, the gap-free measurement apparatus may include a processor and a communications interface. The communications interface is coupled to the processor. The processor is configured to run computer programs or instructions, to implement the gap-free measurement method according to any one of the eighth aspect and the embodiments of the eighth aspect.

In another possible design, the gap-free measurement apparatus may further include a memory. The memory is configured to store computer-executable instructions and data that are necessary for the gap-free measurement apparatus. When the gap-free measurement apparatus runs, the processor executes the computer-executable instructions stored in the memory, so that the gap-free measurement apparatus performs the gap-free measurement method according to any one of the eighth aspect or the embodiments of the eighth aspect.

According to an eleventh aspect, a computer-readable storage medium is provided. The computer-readable storage medium may be a readable non-volatile storage medium. The computer-readable storage medium stores computer instructions or programs. When the computer instructions or the programs are run on a computer, the computer is enabled to perform the gap-free measurement method according to any one of the eighth aspect or the embodiments of the eighth aspect.

According to a twelfth aspect, a computer program product including instructions is provided. When the computer program product runs on a computer, the computer is enabled to perform the gap-free measurement method according to any one of the eighth aspect or the embodiments of the eighth aspect.

According to a thirteenth aspect, a gap-free measurement apparatus is provided. The gap-free measurement apparatus may be a first access network device or a chip or a system-on-a-chip in the first access network device. The gap-free measurement apparatus includes one or more processors and one or more memories. The one or more memories are coupled to the one or more processors, and the one or more memories are configured to store computer program code. The computer program code includes computer instructions. When the one or more processors execute the computer instructions, the terminal device is enabled to perform the gap-free measurement method according to any one of the eighth aspect or the embodiments of the eighth aspect.

According to a fourteenth aspect, a chip is provided. The chip includes a processor and a communications interface. The processor is coupled to a memory through the communications interface, and when the processor executes computer programs or instructions in the memory, the gap-free measurement method described in any one of the eighth aspect and the embodiments of the eighth aspect is performed.

For technical effects achieved by any one of the designs of the ninth aspect to the fourteenth aspect, refer to the technical effects achieved by any one of the eighth aspect or the embodiments of the eighth aspect. Details are not described again.

According to a fifteenth aspect, a gap-free measurement method is provided. The gap-free measurement method includes: An access network device sends to a terminal device, configuration information used to indicate the terminal device to perform gap-free measurement on a neighboring cell of a serving cell of the terminal device and used to indicate at least one resource unit including radio frequency channels that can be used as radio frequency channels of a resource unit to be measured in the neighboring cell. The access network device receives, from the terminal device, a configuration completion response used to indicate a second resource unit included in the at least one resource unit and/or a MIMO capability of a second resource unit.

Based on the gap-free measurement method provided in the fifteenth aspect, after the access network device sends, to the terminal device, the configuration information used to indicate the terminal device to perform gap-free measurement on the neighboring cell of the serving cell of the terminal device and used to indicate the at least one resource unit whose radio frequency channels can be used as that of the resource unit to be measured in the neighboring cell, so that the terminal device determines the radio frequency channels of the resource unit to be measured in the neighboring cell based on the configuration information. The terminal device can receive information about the neighboring cell on the radio frequency channels of the resource unit to be measured, and the terminal device can perform gap-free measurement on the neighboring cell. This resolves a problem in the conventional technology that the terminal device cannot perform gap-free measurement on the neighboring cell because the terminal device has no radio frequency channel to receive a signal from the neighboring cell.

In an embodiment, with reference to any one of the fifteenth aspect or the embodiments of the fifteenth aspect, when the radio frequency channels of the resource unit to be measured in the neighboring cell of the serving cell of the terminal device are some of the radio frequency channels of the second resource unit, the access network device receives or sends uplink and downlink signals on the second resource unit by using a reduced MIMO capability.

Based on this embodiment, the access network device sends the uplink and downlink signals to the terminal device on the second resource unit by using the reduced MIMO capability. In this way, the terminal device can receive a signal from the neighboring cell by using some of the radio frequency channels of the second resource unit, so that the terminal device can perform gap-free measurement on the neighboring cell. At the same time, the uplink and downlink signals can still be continuously received or sent on the second resource unit. This maintains data transmission.

In an embodiment, with reference to any one of the fifteenth aspect or the embodiments of the fifteenth aspect, when the radio frequency channels in the neighboring cell of the serving cell of the terminal device are all of the radio frequency channels of the second resource unit, the access network device stops receiving or sending uplink and downlink signals on the second resource unit.

Based on this embodiment, the access network device stops sending the uplink and downlink signals to the terminal device on the second resource unit. In this way, the access network device can send, to the terminal device, a signal from the neighboring cell by using the radio frequency channels of the second resource unit, so that the terminal device can perform gap-free measurement on the neighboring cell.

According to a sixteenth aspect, a gap-free measurement apparatus is provided. The apparatus is used in an access network device or a chip or a system-on-a-chip in the access network device, or may be a functional module that is in the access network device and that is configured to implement the method according to any one of the fifteenth aspect or the embodiments of the fifteenth aspect. The gap-free measurement apparatus may implement functions performed by the terminal device in the foregoing aspects or the possible designs, and the functions may be implemented by hardware executing corresponding software. The hardware or the software includes one or more modules corresponding to the functions. For example, the gap-free measurement apparatus includes a communication unit and a processing unit.

The communication unit is configured to send, to the terminal device, configuration information used to indicate the terminal device to perform gap-free measurement on a neighboring cell of a serving cell of the terminal device and used to indicate at least one resource unit including radio frequency channels that can be used as radio frequency channels of a resource unit to be measured in the neighboring cell; and is further configured to receive, from the terminal device, a configuration completion response used to indicate a second resource unit included in the at least one resource unit and/or a MIMO capability of a second resource unit.

For a specific implementation of the gap-free measurement apparatus, refer to behavior and a function of the terminal device in the gap-free measurement method provided in any one of the fifteenth aspect or the embodiments of the fifteenth aspect. Details are not described herein again. Therefore, the provided gap-free measurement apparatus can achieve same beneficial effects as any one of the fifteenth aspect or the embodiments of the fifteenth aspect.

According to a seventeenth aspect, a gap-free measurement apparatus is provided. The gap-free measurement apparatus may be an access network device or a chip or a system-on-a-chip in the access network device. The gap-free measurement apparatus may implement functions performed by the access network device in the foregoing aspects or possible designs. The functions may be implemented by hardware. For example, in a possible design, the gap-free measurement apparatus may include a processor and a communications interface. The processor is configured to run computer programs or instructions, to implement the gap-free measurement method described in any one of the fifteenth aspect or the embodiments of the fifteenth aspect.

In another possible design, the gap-free measurement apparatus may further include a memory. The memory is configured to store computer-executable instructions and data that are necessary for the gap-free measurement apparatus. When the gap-free measurement apparatus runs, the processor executes the computer-executable instructions stored in the memory, so that the gap-free measurement apparatus performs the gap-free measurement method according to any one of the fifteenth aspect or the embodiments of the fifteenth aspect.

According to an eighteenth aspect, a computer-readable storage medium is provided. The computer-readable storage medium may be a readable non-volatile storage medium. The computer-readable storage medium stores computer instructions or programs. When the computer instructions or programs are run on a computer, the computer is enabled to perform the gap-free measurement method according to any one of the fifteenth aspect or the embodiments of the foregoing aspect.

According to a nineteenth aspect, a computer program product including instructions is provided. When the computer program product runs on a computer, the computer is enabled to perform the gap-free measurement method according to any one of the fifteenth aspect or the embodiments of the foregoing aspect.

According to a twentieth aspect, a gap-free measurement apparatus is provided. The gap-free measurement apparatus may be an access network device or a chip or a system-on-a-chip in the access network device, and the gap-free measurement apparatus includes one or more processors and one or more memories. The one or more memories are coupled to the one or more processors, and the one or more memories are configured to store computer program code. The computer program code includes computer instructions. When the one or more processors execute the computer instructions, the terminal device is enabled to perform the gap-free measurement method according to any one of the fifteenth aspect or the embodiments of the fifteenth aspect.

According to a twenty-first aspect, a chip system is provided. The chip system includes a processor and a communications interface. The chip system may be configured to implement functions performed by the terminal device in any one of the fifteenth aspect or the embodiments of the fifteenth aspect, for example, the processor is configured to send, to the terminal device through the communications interface, configuration information used to indicate the terminal device to perform, on a first resource unit, gap-free measurement on a neighboring cell of a serving cell of the terminal device. In a possible design, the chip system further includes a memory. The memory is configured to store program instructions and/or data. The chip system may include a chip, or may include a chip and another discrete component. This is not limited herein.

For technical effects achieved by any one of the designs of the sixteenth aspect to the twenty-first aspect, refer to the technical effects achieved by any one of the fifteenth aspect or the embodiments of the fifteenth aspect. Details are not described again.

According to a twenty-second aspect, this application provides a communications system, including an access network device and a terminal device that communicates with the access network device. The access network device is configured to perform the gap-free measurement method described in any one of the first aspect or the embodiments of the first aspect; or the access network device is configured to perform the gap-free measurement method described in any one of the fifteenth aspect or the embodiments of the fifteenth aspect; and the terminal device is configured to perform the gap-free measurement method described in any one of the eighth aspect or the embodiments of the eighth aspect.

DESCRIPTION OF EMBODIMENTS

Figure 1:
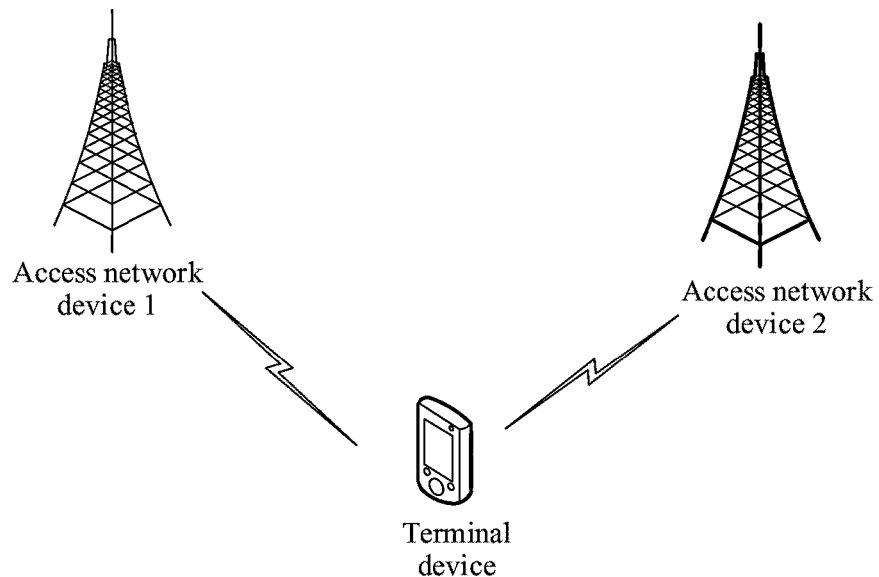
FIG. 1 is a schematic diagram of a dual connectivity scenario according to an embodiment of this application.

Before embodiments of this application are described, some terms in embodiments of this application are explained.

Resource unit: A resource unit may be a frequency resource used to transmit data. For example, a terminal device may transmit uplink data and/or downlink data with an access network device on the resource unit. The resource unit may include frequency resources such as a component carrier (CC), a bandwidth part (BWP), a band, and a cell, or may include a frequency resource in another granularity. This is not limited.

The terminal device may transmit uplink data and/or downlink data with the access network device on one resource unit, or may transmit uplink data and/or downlink data with the access network device on a plurality of resource units to improve spectral efficiency and a user throughput of a system. In this application, descriptions are provided by using an example in which the terminal device transmits uplink data and/or downlink data with the access network device on a plurality of resource units.

The plurality of resource units may be combined to form a resource unit combination. The resource unit combination may include the plurality of resource units and a MIMO capability corresponding to each resource unit. The plurality of resource units may be resource units in a same cell group, for example, may be a plurality of CCs in carrier aggregation (CA). Alternatively, the plurality of resource units may be resource units in different cell groups accessed by the terminal device in a dual connectivity (DC) mode. This is not limited.

Cell: A cell may be an area used to provide a wireless communication service for a terminal device. An access network device provides the wireless communication service for the terminal device in the area. The access network device may manage the cell. Each cell corresponds to a cell identifier (cell ID), and the cell identifier uniquely identifies the cell. If the terminal device camps on a cell and is to access the camped cell, the cell may be referred to as a camped cell or a serving cell of the terminal device, and a cell around the serving cell and a cell neighboring to the serving cell may be referred to as a neighborhood cell (neighborhood cell) or a neighboring cell of the serving cell.

Carrier aggregation (CA): Carrier aggregation indicates aggregation of two or more CCs together to support a higher transmission bandwidth (for example, 100 megahertz (MHz)). Each CC corresponds to an independent cell, and one CC may be equivalent to one cell. A 3rd generation partnership project (3GPP) protocol specifies that a plurality of CCs may be configured (for example, a maximum of five CCs or 32 CCs may be configured) for one terminal device. In the plurality of CCs configured for the terminal device, one CC may be referred to as a primary cell (PCell), and is a cell established when the terminal device performs initial connection, a cell re-established when the terminal device performs radio resource control (RRC) connection, or a primary cell designated in a handover (handover) process. The PCell is responsible for RRC communication with the terminal device. A remaining CC is referred to as a secondary cell (SCell). The SCell is added during RRC reconfiguration of the terminal device, and is used to provide an additional radio resource.

The two or more CCs are CCs in a same radio access technology. For example, the radio access technology may be long term evolution (LTE) or new radio (NR), or the radio access technology may be another radio access technology. This is not limited.

In an example, CA includes two CCs (for example, a CC 1 and a CC 2). A representation form of the CA may be CA_[band indication][bandwidth level]-[band indication][bandwidth level].

In the representation form of the CA, the CA is divided into two parts by using "_" as separators. A first part "CA" indicates that the combination is a CA combination. A second part "[band indication][bandwidth level]-[band indication][bandwidth level]" indicates a combination of the CC 1 and the CC 2. Each CC may include "[band indication][bandwidth level]".

A band indication indicates a band in which a CC is located. A band may be represented by using a number or a character, and carriers corresponding to different radio access technologies may be represented by using different symbols. For example, a band in which a carrier in LTE is located may be represented by using a number. For example, 1 indicates that the band in which the CC in the LTE is located is a band 1, and 2 indicates that the band in which the CC in the LTE is located is a band 2. A band in NR may be represented by using a combination of a character and a number. For example, n1 indicates that the band in which a CC in the NR is located is a band 1, and n78 indicates that the band in which the CC in the NR is located is a band 78. In this embodiment of this application, the band may alternatively be represented in another form. This is not limited.

A bandwidth level indicates a quantity of intra-band contiguous CCs supported by a band in which a CC is located.

In an example, bandwidth levels in NR and bandwidth levels in LTE are shown in Table 1. The bandwidth levels in the NR may include A, B, C, D, E, F, G, H, I and J. The bandwidth levels in the LTE may include A, B, C, D, E, F and I. For a quantity of contiguous CCs supported by a carrier corresponding to each bandwidth level, refer to Table 1.

TABLE 1

| Bandwidth level in NR | | Bandwidth level in LTE | |
| --- | --- | --- | --- |
| Bandwidth level | Quantity of intra-band contiguous CCs supported by a band | Bandwidth level | Quantity of intra-band contiguous CCs supported by a band |
| A | 1 | A | 1 |
| B | 2 | B | 2 |
| C | 2 | C | 2 |
| D | 3 | D | 3 |
| E | 4 | E | 4 |
| F | 2 | F | 5 |
| G | 3 | I | 6 |
| H | 4 | | |
| I | 5 | | |
| J | 6 | | |

It should be noted that, in Table 1, when a bandwidth level in the NR is "A", the band supports one intra-band contiguous CC. When a bandwidth level in the NR is "B", the band supports two intra-band contiguous CCs. When a bandwidth level in the LTE is "A", the band supports one intra-band contiguous CC. When a bandwidth level in the LTE is "B", the band supports two intra-band contiguous CCs. For intra-band contiguous CCs supported corresponding to bandwidth levels "C" to "J" in the NR and bandwidth levels "C" to "I" in the LTE, refer to Table 1. Details are not described again.

In embodiments of this application, the bandwidth levels in the NR and the bandwidth levels in the LTE may further include another bandwidth level. This is not limited. The representation form of the bandwidth level is merely an example, and may alternatively be another representation form, for example, a Roman numeral. This is not limited. A quantity of intra-band contiguous CCs supported corresponding to each bandwidth level may also be another value. This is not limited.

In an example, with reference to Table 1, for a combination CA_n1A-n3C, "CA" indicates that the carrier combination is a CA combination, and "n1A-n3C" indicates that the carrier combination includes a CC 1 and a CC 2. The CC 1 and the CC 2 are CCs in NR, a band 1 in which the CC 1 is located supports one intra-band CC, and a band 3 in which the CC 2 is located supports two intra-band contiguous CCs. The band 1 is a primary component carrier in the carrier combination, and the band 3 is a secondary component carrier (SCC) in the carrier combination.

In another example, with reference to Table 1, for a combination CA_1A-3C, "CA" indicates that the carrier combination is a CA combination, and "1A-3C" indicates that the carrier combination includes a CC 1 and a CC 2 in LTE. A band 1 in which the CC 1 is located supports one intra-band CC, and a band 3 in which the CC 2 is located supports two intra-band contiguous CCs.

The CC 1 is a primary component carrier in the carrier combination, and CC 2 is an SCC in the carrier combination.

Dual connectivity (DC): Dual connectivity may support two access network devices simultaneously providing data transmission services for one terminal device. An access network device in a PCell is referred to as a master access network device (for example, a master gNB, MgNB for short), and the other access network device (namely, an access network device in a primary secondary cell (PSCell)) is referred to as a secondary access network device (for example, a secondary gNB, SgNB for short). The master access network device is a control anchor, that is, the terminal device establishes an RRC connection to the master access network device. In addition, a control plane connection is established between the master access network device and a core network, and an RRC message is transmitted between the master access network device and the terminal device. In a subsequent enhanced technology, some RRC messages (for example, configuration information and a measurement report) may also be sent between the secondary access network device and the terminal device.

The DC may be within a same access technology or between different access technologies. For example, two groups of LTE may form LTE DC, two groups of NR may form NR DC, and one group of LTE and one group of NR may form E-UTRA-NR dual connectivity (EN-DC) or NR-E-UTRA dual connectivity (NE-DC).

In the DC, the two access network devices connected to the terminal device may be the master access network device and the secondary access network device. Cells covered by the access network devices may form one CA group, and the two access network devices may be considered as two CA groups. A CA group covered by the master access network device may be a master cell group (MCG). The MCG may carry a control plane and a user plane of the terminal device, and may be responsible for sending a service to the terminal device, or may be responsible for sending control signaling to the terminal device. A CA group covered by the secondary access network device may be referred to as a secondary cell group (SCG). The SCG may carry a user plane of the terminal device, and may be responsible for sending a service to the terminal device.

For example, in the EN-DC, the access network device in the LTE is the MCG, and the access network device in the NR is the SCG. In the NE-DC, the access network device in the NR is the MCG, and the access network device in the LTE is the SCG.

For example, as shown in FIG. 1, a terminal device may be in communication connection to both an access network device 1 and an access network device 2. It is assumed that a cell covered by the access network device 1 forms a CA group 1, a cell covered by the access network device 2 forms a CA group 2, the CA group 1 is an MCG, and the CA group 2 is an SCG. In this case, the access network device 1 may send control signaling and transmit a service to the terminal device on the CA group 1, and the access network device 2 may transmit a service and the like to the terminal device on the CA group 2. The access network device 1 may be a master access network device, and the access network device 2 may be a secondary access network device. The access network device 1 may be a secondary access network device, and the access network device 1 may be a master access network device. This is not limited.

For example, resource units are carriers. A representation form of DC may be: DC [band indication][bandwidth level]-[band indication][bandwidth level][band indication][bandwidth level]-[band indication][bandwidth level].

In the representation form of the DC, the DC is divided into three parts by using "_" as separators. A first part "DC" indicates that the combination is a DC combination. A second part "[band indication][bandwidth level]-[band indication][bandwidth level]" indicates a carrier combination of an MCG, where the carrier combination of the MCG includes one or more carriers. A third part "[band indication][bandwidth level]-[band indication][bandwidth level]" indicates a carrier combination of an SCG, where the carrier combination of the SCG includes one or more carriers.

For specific descriptions of a band indication and a bandwidth level in the second part and the third part, refer to the descriptions of the band indication and the bandwidth level in the CA. Details are not described herein again.

In an example, with reference to Table 1, for a carrier combination DC_1A-3C_n78C, "DC" indicates that the carrier combination is a DC combination; "1A-3C" indicates that an MCG in the carrier combination includes a CC 1 and a CC 2 in LTE, where a band in which the CC 1 is located is a band 1, a band in which the CC 2 is located is a band 3, and the CC 2 includes two intra-band contiguous CCs; and "n78C" indicates that an SCG in the carrier combination includes a CC 3 in NR, where a band in which the CC 3 is located is a band 78, and the CC 3 includes two intra-band contiguous CCs.

It should be noted that CA and DC may be collectively referred to as BC (band combination).

It should be noted that, regardless of whether CA or a DC combination is supported, the terminal device needs to simultaneously work on a plurality of carriers. Therefore, the CA and DC combination supported by the terminal device is limited by a design of a radio frequency channel (or a receiver) of the terminal device. Frequencies of different bands may require different radio frequency channels, or may share a same radio frequency channel. This depends on a specific design of the terminal device. Generally, a larger quantity of radio frequency channels of the terminal device indicates a larger quantity of CA or DC combinations that can be supported.

In addition, LTE and NR each further support a multi-input multi-output (MIMO) multi-antenna technology. If the terminal device supports four-antenna reception on one CC, namely, reception on the CC by using four antennas, four radio frequency channels need to be correspondingly occupied. It can be learned that in different CA or DC combinations, a MIMO capability of each CC is also limited by the design of the radio frequency channel (or the receiver) of the terminal device. A larger quantity of radio frequency channels of the terminal device indicates a higher MIMO capability theoretically supported in same CA/DC. A downlink MIMO capability is usually expressed as xR, where "x" may be a number 1, 2, 4, or the like. For example, 4R indicates four-antenna reception. Generally, each CC has a capability of at least 2R. A combination of MIMO capabilities of CCs in the CA/DC is referred to as a CA/DC MIMO capability combination. For example, a MIMO capability combination of DC_1A_3A_7A-n78 is 4R+2R+4R+4R, that is, CCs of a band 1, a band 7, and a band n78 support a 4R MIMO capability, and a CC of a band 3 supports a 2R MIMO capability. When the design of the radio frequency channel of the terminal device is fixed, a maximum MIMO capability combination in each CA/DC is also determined.

Therefore, when the design of the radio frequency channel of the terminal device is fixed, and the terminal device works in a CA/DC combination including CCs with different MIMO capabilities, capabilities about whether a measurement gap is required for measuring inter-frequency or inter-RAT neighboring cells on a band are different. For example, the terminal device has a capability of DC_1A_3A-n78 (certainly, DC_1A-n78 is also supported). CCs of a band 1, a band 3, and a band n78 all support 4R. However, the terminal device does not support DC_1A_3C-n78 and DC_1A_3A_3A-n78. In this case, when the terminal device works in DC_1A-n78, the terminal device can support measurement without a measurement gap during inter-frequency neighboring cell measurement on the band 3. However, when the terminal device works in DC_1A_3A-n78, a base station configures the band 3 with 4R, and the terminal device then performs measurement on inter-frequency neighboring cells on the band 3. In this case, the terminal device supports only measurement with a measurement gap because there is no remaining radio frequency channel used to receive signals from the inter-frequency neighboring cells on the band 3.

In an example, when accessing a base station, the terminal device may notify, by using RRC signaling (for example, capability information of the terminal device (UECapabilityInformation)), the base station of a CA combination and a DC combination supported by the terminal device and a MIMO capability combination in each combination. The base station may configure, for the terminal device by using RRC signaling (for example, RRC connection reconfiguration (ConnectionReconfiguration)), CCs to form a CA or DC combination, and configure a MIMO capability of each CC. An LTE capability part of UECapabilityInformation may further indicate a capability about whether a measurement gap is required for measuring each band in each LTE CA (including 2G, 3G, and 4G bands). The Release 15 protocol stipulates that a measurement gap is required when inter-frequency or inter-RAT neighboring cells are NR cells.

Therefore, the RRC signaling (CapabilityInformation) does not have a field indicating whether the measurement gap is required for each NR band in different CA/DC.

Figure 2:
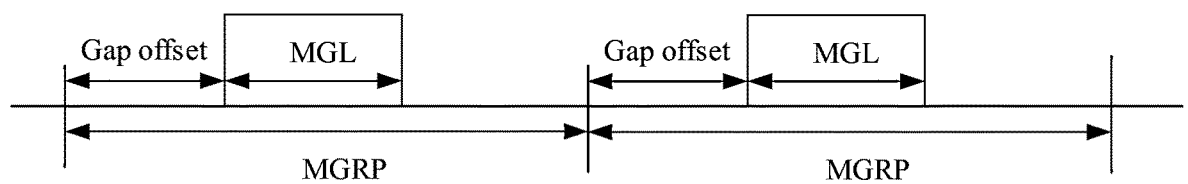
FIG. 2 is a schematic diagram of a measurement gap configured by a base station according to an embodiment of this application.

When the terminal device does not support measurement without the measurement gap, the base station needs to configure the measurement gap when configuring measurement of the terminal device. The measurement gap may be configured as shown in FIG. 2. The configuration mainly includes three parameters: a measurement gap repetition period (MGRP) used to configure a measurement gap period; a measurement gap length (MGL) used to configure a length of a measurement gap, where a maximum length of the measurement gap may be 6 ms; and a gap offset used to configure a start location of a measurement gap. The terminal device may determine, based on the three parameters, that the start location of the measurement gap is on a system frame number (SFN) and a subframe that meet the following conditions:

SFN mod $T$=FLOOR (gapOffset/10);

subframe=gap Offset mod 10; and

Measurement period $T$=MGRP/10.

It should be noted that when measuring an NR cell to be measured, the terminal device may perform measurement based on an SSB. If the terminal device uses a measurement manner with a measurement gap, the base station needs to configure an accurate location of the measurement gap for the terminal device. The location needs to include the SSB of the NR cell to be measured.

Synchronization signal block (SSB): A synchronization signal block includes a primary synchronization signal (PSS), a secondary synchronization signal (SSS), and a physical broadcast channel (PBCH). The synchronization signal block may be used for synchronization, time-frequency tracking, radio resource measurement, and the like.

Figure 3:
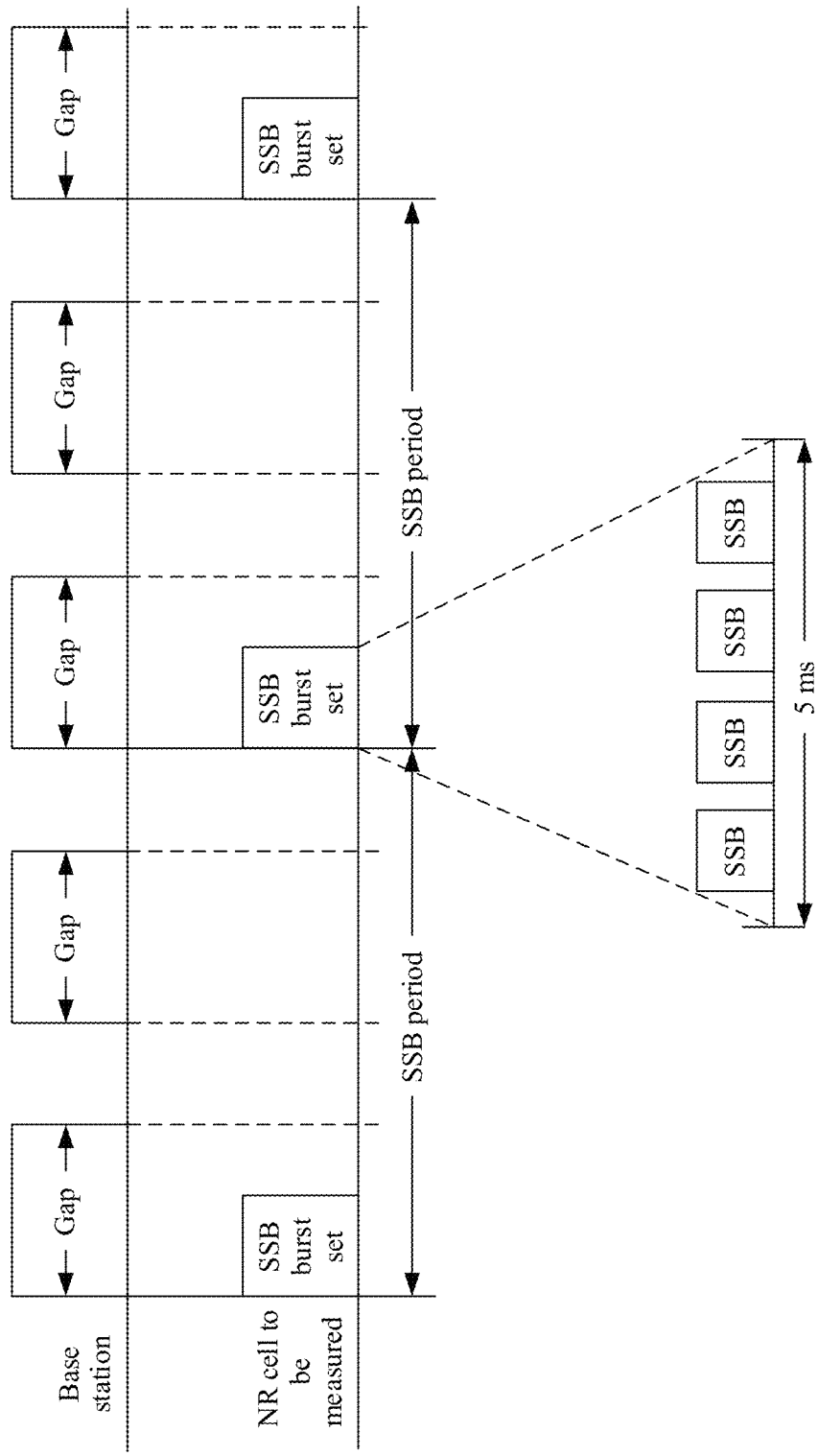
FIG. 3 is a schematic diagram of a structure of a measurement gap configured by a base station according to an embodiment of this application.

In an example, as shown in FIG. 3, the SSB of the NR cell to be measured may be sent in a time period (which may also be referred to as an SSB period). The time period may be set as required, for example, may be 5 ms, 10 ms, 20 ms, 40 ms, 80 ms, or 160 ms. This is not limited. The NR cell to be measured may send a plurality of SSBs in one period, and the plurality of SSBs may be sent in one time period. In other words, a plurality of SSBs in one time period may be referred to as one SSB burst set. For example, the SSB period of the NR cell to be measured is 20 ms, and the SSB period includes four 5 ms periods. One SSB burst set of the NR cell is transmitted in one 5 ms, and an SSB does not occur in the other three 5 ms periods. Therefore, when the base station configures the measurement gap for the terminal device, the configured measurement gap (a measurement gap shown by a solid line in FIG. 3) needs to include an SSB sending moment. Otherwise, the terminal device cannot receive the SSB from the NR cell to be measured in the measurement gap (a measurement gap shown by a dashed line in FIG. 3), and therefore cannot measure the NR cell to be measured.

Further, to measure the NR cell to be measured, the base station may further configure measurement time configuration (SMTC) for each frequency to be measured.

SMTC: SMTC is a window with a maximum period of 160 ms and a maximum window length of 5 ms. The Release 15 protocol stipulates that a terminal device performs SSB measurement only at a location where an SMTC window and a measurement gap overlap, and an SMTC period configured by a base station is greater than an SSB period.

Figure 4:
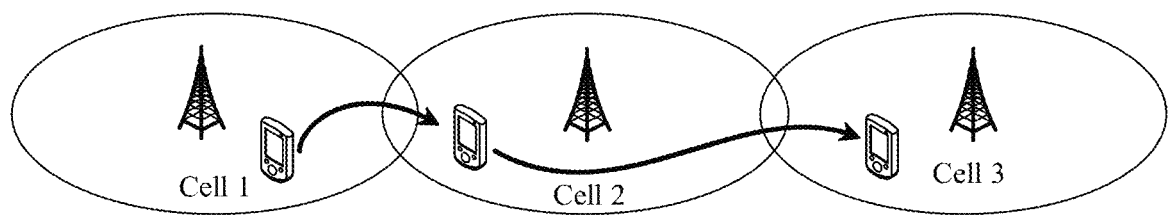
FIG. 4 is a schematic diagram of a simplified architecture of a communications system according to an embodiment of this application.
Figure 5:
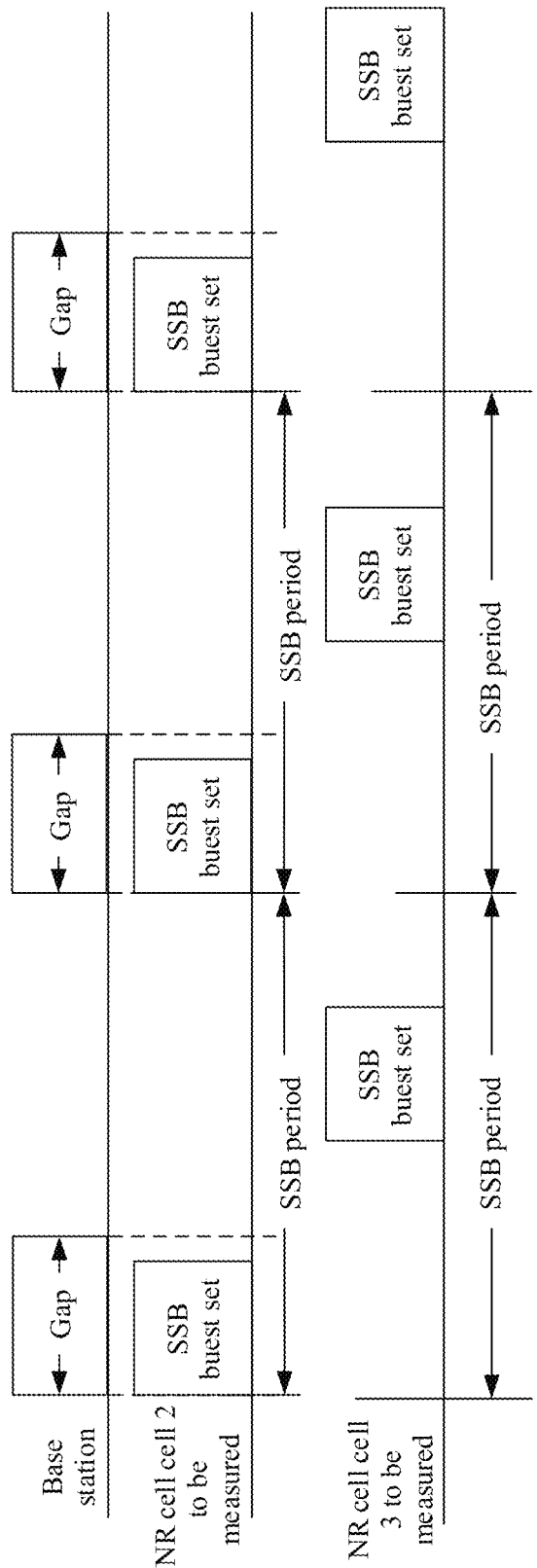
FIG. 5 is a schematic diagram of a structure of a measurement gap configured by a base station according to an embodiment of this application.

Therefore, when the base station configures the measurement gap of an NR cell to be measured, it needs to ensure that the configured measurement gap includes a complete SSB burst set of the NR cell to be measured. However, there are some difficulties in practice. Specifically, a location of the measurement gap configured by the base station is based on timing of a serving cell, and a location of the SSB of the NR cell to be measured is based on timing of the NR cell. If the serving cell is not synchronized with the NR cell to be measured, the base station configures the measurement gap for the terminal device at the correct location only when knowing a timing offset between the serving cell and the NR cell to be measured. Then, even if determining a timing offset between the serving cell and each neighboring cell, the base station cannot configure an appropriate measurement gap in some cases. For example, as shown in FIG. 4, the terminal device accesses a cell 1. A cell 2 and a cell 3 are inter-frequency neighboring cells of the cell 1, and the cell 1 is not synchronized with the cell 2 and the cell 3. Therefore, an SSB from the cell 2 and an SSB from the cell 3 are not at a same location. If the base station cannot determine whether the terminal device is at an edge of the cell 2 or the cell 3, the base station cannot determine whether the measurement gap should be configured at a location of the SSB of the cell 2 or a location of the SSB of the cell 3. As shown in FIG. 5, if the terminal device is at the edge of the cell 3, and the measurement gap configured by the base station includes only the location of the SSB from the cell 2, the terminal device cannot measure the cell 3, and cannot be handed over to the cell 3.

Radio frequency channel: A radio frequency channel in embodiments of this application indicates a radio frequency receive channel, and may also be referred to as a receiver or a radio frequency channel. A radio frequency channel of a terminal device is configured to receive a signal from an access network device, and a radio frequency channel of the access network device is configured to receive a signal from the terminal device.

Whether the terminal device supports gap-free measurement may be determined based on a quantity of radio frequency channels of the terminal device.

For example, in an RRC_CONNECTED state, if the radio frequency channels of the terminal device can simultaneously receive a signal from a serving cell and a signal from a neighboring cell, the terminal device can complete measurement on the neighboring cell without a measurement gap. That is, the terminal device may perform gap-free measurement on the neighboring cell. If the radio frequency channels of the terminal device cannot simultaneously receive a signal from a serving cell or a signal from a neighboring cell, that is, the terminal device does not have an additional radio frequency channel to receive the signal from the neighboring cell, in this case, the terminal device needs to perform gap measurement in a period of time. In a gap measurement process, the terminal device may stop, a radio frequency channel used for receiving from the serving cell, from receiving the signal from the serving cell, and enable the radio frequency channel to work at a frequency of the neighboring cell, to receive the signal from the neighboring cell, thereby completing measurement on the neighboring cell.

It should be noted that in both CA and DC, the terminal device needs to simultaneously work on a plurality of carriers (serving cells). Therefore, a CA combination and a DC combination supported by the terminal device are limited by a design of the radio frequency channel of the terminal device. Frequencies of different carriers may require different radio frequency channels, or may require a same radio frequency channel. This is related to a specific design of the terminal device. A larger quantity of radio frequency channels of the terminal device indicates a larger quantity of CA or DC combinations that can be supported.

MIMO capability: A MIMO capability is usually represented as xR, where x is a number, for example, 1, 2, or 4. Each CC has a capability of at least 2R. For example, if a MIMO capability of a CC is 4R, it indicates that the CC supports four-antenna reception. A MIMO capability of each resource unit in a resource unit combination supported by a terminal device is a quantity of antennas or radio frequency channels used by the terminal device to receive a signal from the resource unit in the resource unit combination. The resource unit combination may be the foregoing CA or DC.

For CCs in different CA or DC, MIMO capabilities of the CCs are also limited by a design of a radio frequency channel. A larger quantity of radio frequency channels of the terminal device indicates a higher MIMO capability corresponding to the terminal device in same CA/DC.

A combination of MIMO capabilities of CCs in CA or DC is referred to as a MIMO combination capability of the CA/DC. When a quantity of radio frequency channels of the terminal device is fixed, and the terminal device works in CA or DC including CCs with different MIMO capabilities, capabilities about whether a measurement gap is required for measuring a neighboring cell corresponding to a band are also different.

For example, the terminal device supports DC_1A_3A-n78. MIMO capabilities of CCs of a band 1, a band 3, and a band n78 in DC_1A_3A-n78 are 4R. The terminal device does not support DC_1A_3A_7A-n78. MIMO capabilities of CCs of a band 1, a band 7, and a band n78 in DC_1A_3A_7A-n78 are 4R, and a MIMO capability of a CC of a band 3 is 2R. When working in DC_1A-n78, the terminal device may perform gap-free measurement on a neighboring cell corresponding to the band 3. When the terminal works in DC_1A_3A-n78, and the terminal device performs gap-free measurement on a neighboring cell corresponding to the band 7, the terminal device cannot perform gap-free measurement on the neighboring cell corresponding to the band 7 because the terminal device has no remaining radio frequency channel used to receive a signal from the neighboring cell corresponding to the band 7.

To resolve a problem in the conventional technology that a terminal device cannot perform gap-free measurement on a neighboring cell because the terminal device has no radio frequency channel used to receive a signal from the neighboring cell, embodiments of this application provide a gap-free measurement method, including: A terminal device receives, from an access network device, configuration information used to indicate the terminal device to perform gap-free measurement on a neighboring cell of a serving cell of the terminal device. The terminal device determines, based on the configuration information, that some or all of radio frequency channels of a second resource unit are radio frequency channels of a resource unit to be measured in the neighboring cell. The second resource unit is included in resource units in a first resource unit combination that is configured for the terminal device and in an active state. In this way, the terminal device can perform gap-free measurement on the neighboring cell of the serving cell of the terminal device on some or all radio frequency channels of the second resource unit.

The following describes implementations of embodiments of this application in detail with reference to the accompanying drawings.

The gap-free measurement method provided in embodiments of this application may be used in any communications system that supports communication. The communications system may be a 3GPP communications system, for example, an LTE communications system, a 5G mobile communications system, a new radio (NR) system, an NR vehicle-to-everything (V2X) system and another next-generation communications system; or may be non-3GPP communications systems. This is not limited. The gap-free measurement method provided in embodiments of this application is described below by using FIG. 6 as an example.

It should be noted, a communications system that is described in embodiments of this application is intended to describe the technical solutions in embodiments of this application more clearly, but constitutes no limitation on the technical solutions provided in embodiments of this application. A person of ordinary skill in the art may know that, with evolution of a communications system and emergence of another communications system, the technical solutions provided in embodiments of this application are also applicable to similar technical problems.

Figure 6:
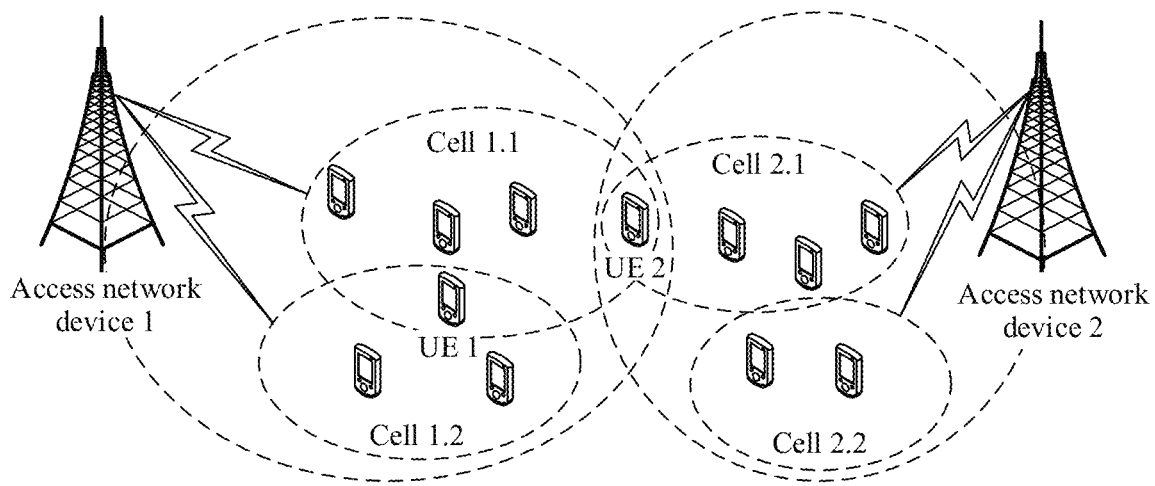
FIG. 6 is a schematic diagram of a simplified architecture of a communications system according to an embodiment of this application.

FIG. 6 is a schematic diagram of a communications system according to an embodiment of this application. As shown in FIG. 6, the communications system may include a plurality of access network devices and a plurality of terminal devices, for example, user equipment (UE). The UE may be located within coverage of the access network device, and is connected to the access network device through a Uu interface. In the system shown in FIG. 6, each access network device may cover one or more cells, the terminal device may work in CA or DC, and the terminal device may be located in one or more cells covered by the access network device. The terminal device may receive, in a cell in which the terminal device is located, a service provided by the access network device. It may also be described as that the access network device may provide a service for the terminal device in a cell covered by the access network device. In this embodiment of this application, a cell that provides a service for the terminal device may be referred to as a serving cell. For example, as shown in FIG. 6, an access network device 1 covers a cell 1.1 and a cell 1.2. UE 1 may be located in the cell 1.1 and the cell 1.2, and may receive, by using the cell 1.1 and the cell 1.2, a service provided by the access network device 1. In this case, the cell 1.1 and the cell 1.2 may be referred to as serving cells of the UE 1. An access network device 2 covers a cell 2.1 and a cell 2.2. UE 2 may be located in the cell 1.1 and the cell 2.1, and may receive, by using the cell 1.1, the service provided by the access network device 1, and receive, by using the cell 2.2, a service provided by the access network device 2. In this case, the cell 1.1 and the cell 2.1 may be referred to as serving cells of the UE 2.

It should be noted that FIG. 6 is merely a diagram of an example framework. In FIG. 6, a quantity of access network devices, a quantity of UEs, and a quantity of cells covered by the access network devices are not limited, and a name of each device is not limited. In addition to the function node shown in FIG. 6, another node may be further included, for example, a core network device, a gateway device, and an application server. This is not limited.

The access network device in FIG. 6 is mainly configured to implement functions such as resource scheduling, radio resource management, and radio access control of the terminal device. Specifically, the access network device may be any node of a small base station, a wireless access point, a transmission reception point (TRP), a transmission point (TP), and another access node. In this embodiment of this application, an apparatus configured to implement a function of the access network device may be an access network device, or may be an apparatus that can support the access network device in implementing the function, for example, a chip system. The gap-free measurement method provided in embodiments of this application is described below by using an example in which the apparatus configured to implement the function of the access network device is the access network device.

The UE in FIG. 6 may be a terminal device (terminal equipment), a mobile station (MS), a mobile terminal (MT), or the like. Specifically, the UE may be a mobile phone, a tablet computer, or a computer with wireless sending and receiving functions, or may be a virtual reality (VR) device, an augmented reality (AR) device, a wireless terminal in industrial control, a wireless terminal in self driving, a wireless terminal in telemedicine, a wireless terminal in a smart grid, a wireless terminal in a smart city, a smart household, a vehicle-mounted terminal, or the like. In embodiments of this application, an apparatus configured to implement a function of the terminal device may be a terminal device, or may be an apparatus that can support the terminal device in implementing the function, for example, a chip system. The gap-free measurement method provided in embodiments of this application is described by using an example in which the apparatus configured to implement the function of the terminal device is the terminal device.

The access network device and the terminal device may be deployed terrestrially, including indoors or outdoors, or may be handheld or vehicle-mounted; or may be deployed on a water surface; or may be deployed on a plane, a balloon, or a man-made satellite in the sky. Application scenarios of the access network device and the terminal device are not limited in embodiments of this application.

Figure 7:
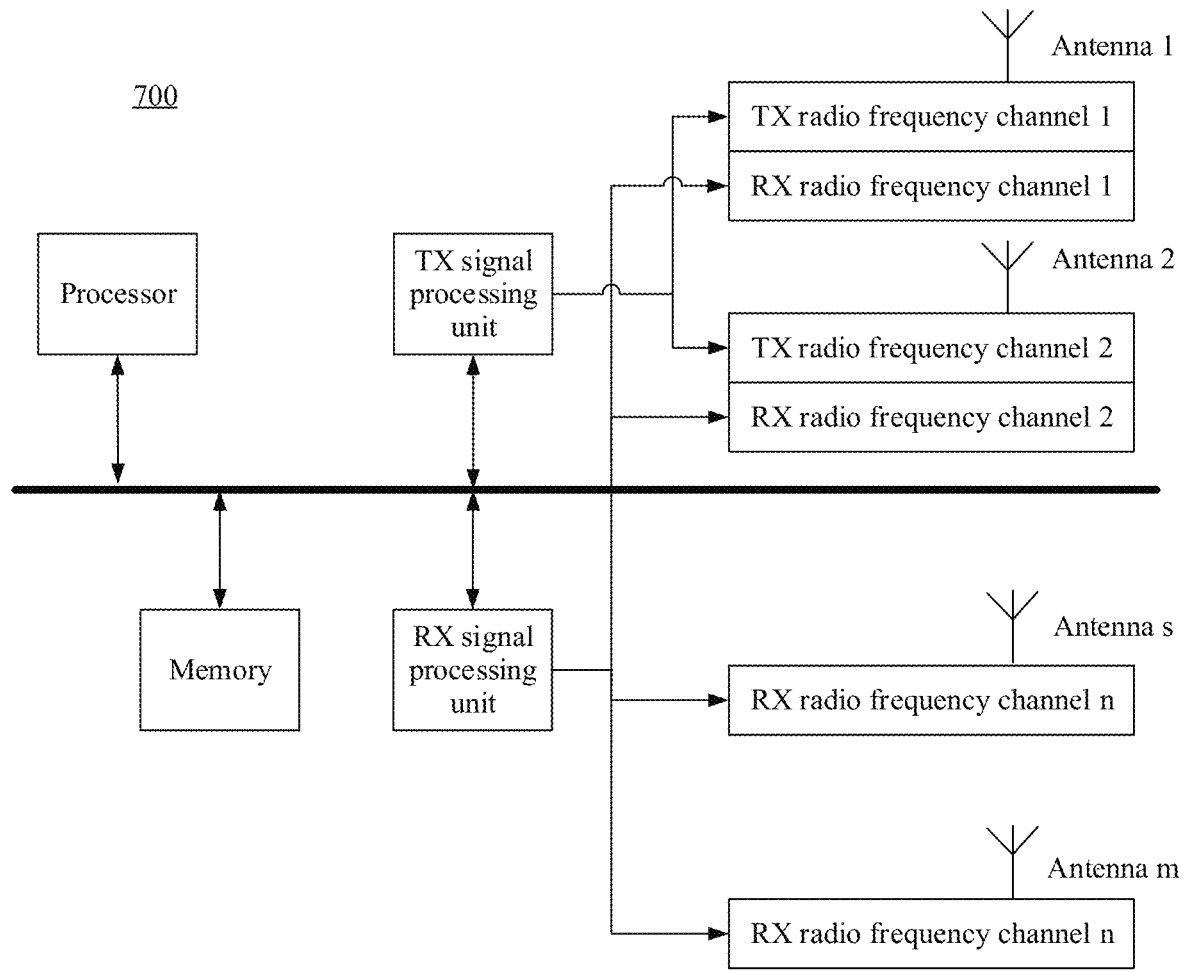
FIG. 7 is a schematic diagram of composition of a gap-free measurement apparatus according to an embodiment of this application.

In a specific implementation, the network elements shown in FIG. 6, for example, the terminal device and the access network device, may have components shown in FIG. 7. FIG. 7 is a schematic diagram of composition of a communication apparatus 700 according to an embodiment of this application. When the communication apparatus 700 has the function of the terminal device in embodiments of this application, the communication apparatus 700 may be a terminal device, or a chip or a system-on-a-chip in the terminal device. When the communication apparatus 700 has the function of the access network device in embodiments of this application, the communication apparatus 700 may be an access network device, or a chip or a system-on-a-chip in the access network device.

As shown in FIG. 7, the communication apparatus 700 may include a memory, a processor, a transmit (TX) signal processing unit, and a receive (RX) signal processing unit. The memory, the processor, the TX signal processing unit, and the RX signal processing unit are connected through a communications line.

The memory may include a static memory configured to store executable code and data, or may include a dynamic memory configured to store instructions and dynamic data.

The processor is configured to control the TX signal processing unit to generate a signal in a predefined manner, and is configured to control the RX signal processing unit to receive a signal in a predefined manner.

The TX signal processing unit is configured to implement various signal processing functions for signal sending, including processes such as channel coding, scrambling, modulation, layer mapping, precoding, and antenna mapping.

The RX signal processing unit implements various signal processing functions for signal receiving, including processes such as synchronization, time-frequency tracking, measurement, channel estimation, equalization, demodulation, descrambling, and decoding.

The TX signal processing unit and the RX signal processing unit each are connected to an antenna by using a TX radio frequency channel and an RX radio frequency channel. The TX radio frequency channel modulates a baseband signal to a carrier frequency and sends a modulated signal through the antenna. The RX radio frequency channel demodulates a radio frequency signal received from the antenna into a baseband signal and sends the baseband signal to the RX signal processing unit for processing. Some antennas (for example, an antenna 1 and an antenna 2 in FIG. 7) may be configured to simultaneously perform sending and receiving, and therefore are connected to both a TX radio frequency channel and an RX radio frequency channel. Some antennas (for example, an antenna s and an antenna m in FIG. 7) are configured to only perform receiving, and therefore are connected only to an RX radio frequency channel. The TX radio frequency channel and the RX radio frequency channel may be connected to any antenna. For example, a TX radio frequency channel 1 and an RX radio frequency channel 1 are connected to an antenna 3. The RX radio frequency channel and the TX radio frequency channel are not necessarily connected to the antenna. If the current radio frequency channel is not used, the radio frequency channel is not connected to the antenna. In addition, a same antenna may be connected to a plurality of RX radio frequency channels and/or TX radio frequency channels, and the antenna may work at a plurality of frequencies at the same time. During downlink receiving, signals of a plurality of frequencies received by the antenna are separated by using a filter, and are sent, by using different RX radio frequency channels, to the RX signal processing unit for processing. During uplink transmission, signals of different frequencies from different TX radio frequency channels are combined by using a combiner and then transmitted on the same antenna. All the foregoing connections can be flexibly configured according to service requirements.

Figure 8:
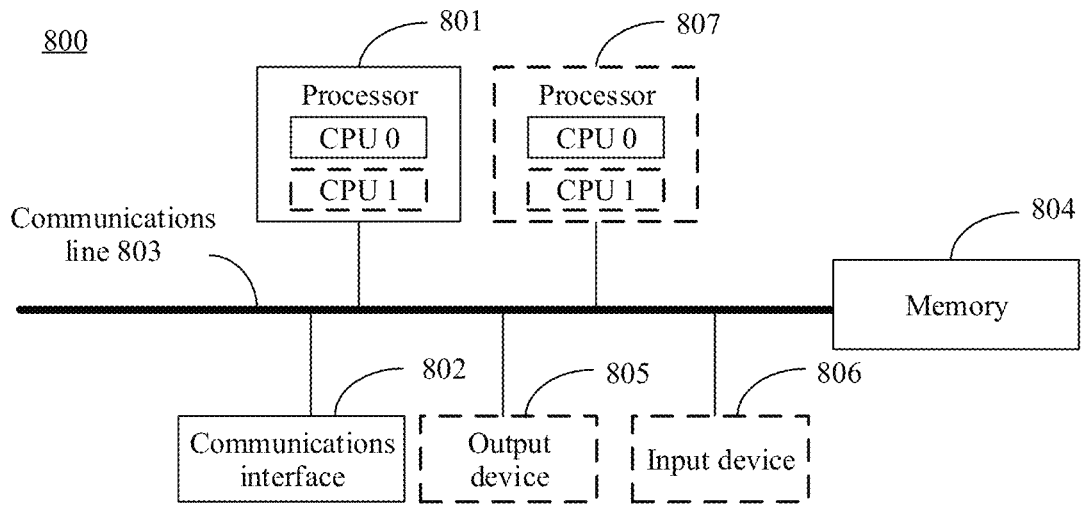
FIG. 8 is a schematic diagram of composition of another gap-free measurement apparatus according to an embodiment of this application.

In another specific implementation, the components shown in FIG. 6, such as the terminal device and the access network device, may use the composition structure shown in FIG. 7 or include components shown in FIG. 8. FIG. 8 is a schematic diagram of composition of a gap-free measurement apparatus 800 according to an embodiment of this application. When the gap-free measurement apparatus 800 has the function of the terminal device in embodiments of this application, the gap-free measurement apparatus 800 may be a terminal device, or a chip or a system-on-a-chip in the terminal device. When the communication apparatus 800 has the function of the access network device in embodiments of this application, the gap-free measurement apparatus 800 may be an access network device, or a chip or a system-on-a-chip in the access network device. As shown in FIG. 8, the gap-free measurement apparatus 800 includes a processor 801, a communications interface 802, and a communications line 803.

Further, the gap-free measurement apparatus 800 may include a memory 804. The processor 801, the memory 804, and the communications interface 802 may be connected to each other through the communications line 803.

The processor 801 is a central processing unit (CPU), a general-purpose processor, a network processor (NP), a digital signal processor (DSP), a microprocessor, a microcontroller, a programmable logic device (PLD), or any combination thereof. Alternatively, the processor 801 may be another apparatus having a processing function, for example, a circuit, a component, or a software module. This is not limited.

The communications interface 802 is used to communicate with another device or another communications network. The another communications network may be an Ethernet, a radio access network (RAN), a wireless local area network (WLAN), or the like. The communications interface 802 may be a module, a circuit, a communications interface, or any apparatus that can implement communication.

The communications line 803 is used to transmit information between the components included in the gap-free measurement apparatus 800.

The memory 804 is configured to store instructions. The instructions may be a computer program.

The memory 804 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or the like. This is not limited.

It should be noted that the memory 804 may exist independently of the processor 801, or may be integrated with the processor 801. The memory 804 may be configured to store instructions, program code, some data, or the like. The memory 804 may be located inside the gap-free measurement apparatus 800, or may be located outside the gap-free measurement apparatus 800. This is not limited. The processor 801 is configured to execute the instructions stored in the memory 804, to implement the gap-free measurement method provided in the following embodiments of this application.

In an example, the processor 801 may include one or more CPUs, for example, a CPU 0 and a CPU 1 in FIG. 8.

In an optional implementation, the gap-free measurement apparatus 800 includes a plurality of processors. For example, in addition to the processor 801 in FIG. 8, the gap-free measurement apparatus 800 also includes a processor 807.

In an optional implementation, the gap-free measurement apparatus 800 further includes an output device 805 and an input device 806. For example, the input device 806 is a device, for example, a keyboard, a mouse, a microphone, or a joystick, and the output device 805 is a device, for example, a display or a speaker.

It should be noted that the gap-free measurement apparatus 800 may be a desktop computer, a portable computer, a network server, a mobile phone, a tablet computer, a wireless terminal, an embedded device, a chip system, or a device with a structure similar to a structure in FIG. 8. In addition, the composition structure shown in FIG. 8 does not constitute a limitation on the terminal device. In addition to the components shown in FIG. 8, the terminal device may include more or fewer components than those shown in the figure, or combine some components, or have different component arrangements.

In embodiments of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Another name may alternatively be used during specific implementation. This is not limited.

In this specification, the claims, and the accompanying drawings of this application, the terms "first", "second", "third", and the like are intended to distinguish between different objects but do not limit a particular order.

In embodiments of this application, the word "example" or "for example" is used to represent giving an example, an illustration, or a description. Any embodiment or design scheme described as an "example" or "for example" in embodiments of this application should not be explained as being more preferable or having more advantages than another embodiment or design scheme. Exactly, use of the word "example", "for example", or the like is intended to present a relative concept in a specific manner.

With reference to the communications system shown in FIG. 6, the following describes the gap-free measurement method provided in embodiments of this application. An access network device and a terminal device in the following embodiments may have components shown in FIG. 7 or FIG. 8. Details are not described again. In embodiments of this application, names of messages exchanged between devices, names of parameters in the messages, or the like are merely examples. Another name may alternatively be used during specific implementation. This is not limited. Actions in embodiments of this application are merely examples, and other names may alternatively be used during specific implementation. For example, "carried in" in embodiments of this application may alternatively be replaced with "carried in" or "included in".

Figure 9:
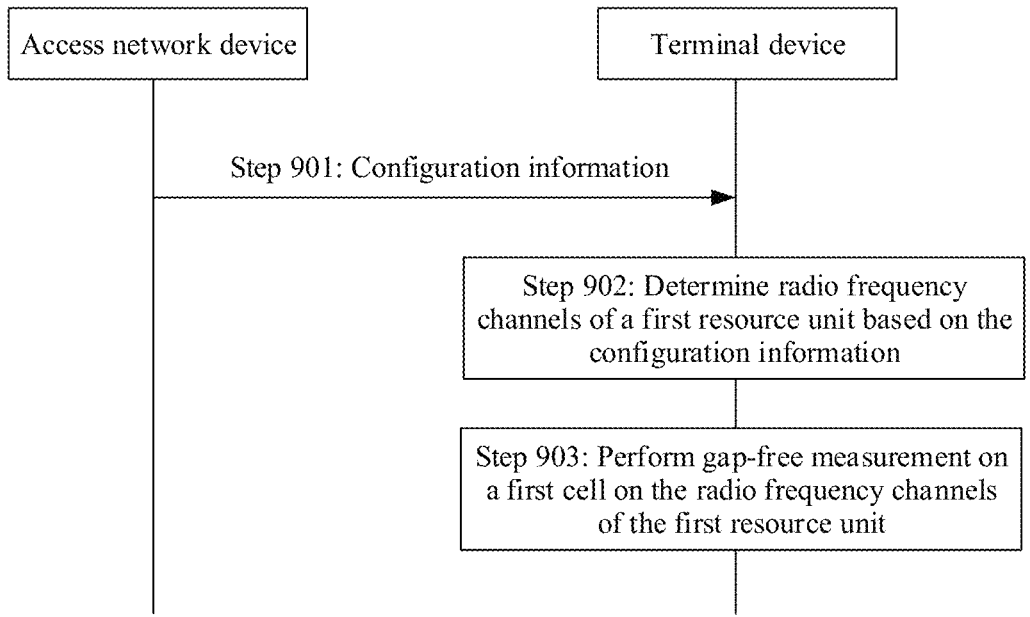
FIG. 9 is a flowchart of a gap-free measurement method according to an embodiment of this application.

FIG. 9 is a flowchart of a gap-free measurement method according to an embodiment of this application. As shown in FIG. 9, the method includes the following operations.

Operation 901: An access network device sends configuration information to a terminal device, and correspondingly, the terminal device receives the configuration information from the access network device.

The terminal device may be any terminal device in FIG. 6, the access network device may be a device that provides a network service for the terminal device, and the access network device is an access network device corresponding to a serving cell of the terminal device.

The configuration information may be used to indicate the terminal device to perform gap-free measurement on a first cell. It may also be replaced with the following description: The configuration information is used to indicate the terminal device to perform gap-free measurement on a first resource unit corresponding to a first cell, or the configuration information is used to indicate the terminal device to perform gap-free measurement on an SSB on a first resource unit. The first cell may be a neighboring cell of the serving cell of the terminal device. The first resource unit may be a resource unit to be measured in the first cell.

The serving cell and the first cell may be cells covered by a same access network device, or may be cells covered by different access network devices.

For example, when the serving cell and the first cell are cells covered by a same access network device, the terminal device may be the UE 1 in FIG. 6, the access network device may be the access network device 1 in FIG. 6, the serving cell may be the cell 1.1 in FIG. 6, and the first cell may be the cell 1.2 in FIG. 6. The first resource unit is a resource unit to be measured in the cell 1.2. When the serving cell and the first cell are cells covered by different access network devices, the terminal device may be the UE 2 in FIG. 6, the access network device may be the access network device 1 or the access network device 2 in FIG. 6. When the access network device is the access network device 1 in FIG. 6, the serving cell may be the cell 1.1 in FIG. 6, the first cell may be the cell 2.1 in FIG. 6, and the first resource unit is a resource unit to be measured in the cell 2.1. When the access network device is the access network device 2 in FIG. 6, the serving cell may be the cell 2.1 in FIG. 6, the first cell is the cell 1.1 in FIG. 6, and the first resource unit is a resource unit to be measured in the cell 1.1.

For example, when determining that the terminal device is located at an edge of the serving cell, the access network device is triggered to send the configuration information to the terminal device.

The access network device may determine, based on signal quality of the serving cell reported by the terminal device, that the terminal device is located at the edge of the serving cell.

For example, when the signal quality of the serving cell reported by the terminal device is lower than a threshold, the access network device may determine that the terminal device is located at the edge of the serving cell. The threshold may be a preset value.

The access network device may send the configuration information to the terminal device by using an RRC message. For example, the configuration information may be carried in the RRC message and sent to the terminal device.

The RRC message may be an RRC connection reconfiguration message or an RRC connection resume message. The RRC connection reconfiguration message may be referred to as an RRC reconfiguration message for short. The RRC connection resume message may be referred to as an RRC resume message for short.

Figure 10:
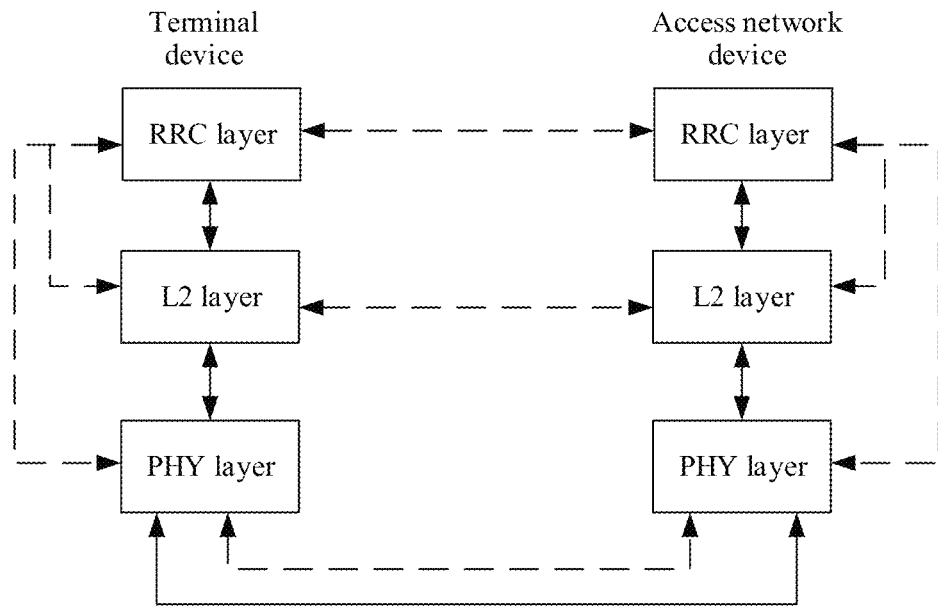
FIG. 10 is a schematic diagram of a software architecture according to an embodiment of this application.

For example, FIG. 10 is a software block diagram according to this embodiment of this application. The terminal device and the access network device each may include an RRC layer, an L2 layer, and a PHY layer. In FIG. 10, a dashed line may be used to represent a control signaling flow, and a solid line may be used to represent a data flow. Both the terminal device and the access network device may configure the L2 layer and the PHY layer by using the RRC layer, and the L2 layer and the PHY layer may indicate a configured structure and status information to the RRC layer. The RRC information and L2 information between the terminal device and the access network device are transferred by using the PHY layer. The RRC information and the L2 information between the access network device and the terminal device are transmitted in a form of data at the PHY layer.

Descriptions are provided below with reference to the schematic diagram in FIG. 9 by using an example in which the access network device sends the configuration information to the terminal device by using the RRC message, and the terminal device sends a measurement result to the access network device after receiving the configuration information.

The access network device encapsulates the RRC message into a data packet in a form of L2 groups, and sends the data packet to the terminal device by using the PHY layer of the access network device. Correspondingly, the terminal device may receive the data packet from the access network device by using the PHY layer of the terminal device. The PHY layer of the terminal device sends the data packet to the L2 layer of the terminal device. After receiving the data packet from the PHY layer of the terminal device, the L2 layer of the terminal device decapsulates the data packet to obtain the RRC message. The L2 layer of the terminal device sends the RRC message to the RRC layer of the terminal device. After receiving the RRC message from the L2 layer of the terminal device, the RRC layer of the terminal device parses the RRC message to obtain the configuration information sent by the access network device. After obtaining the configuration information sent by the access network device, the RRC layer of the terminal device may send an internal configuration message to the PHY layer of the terminal device. The internal configuration message may be used to indicate the PHY layer of the terminal device to perform gap-free measurement on the first cell. After performing gap-free measurement on the cell to be measured, the PHY layer of the terminal device reports the measurement result to the RRC layer of the terminal device. After receiving the measurement result of the PHY layer of the terminal device, the RRC layer of the terminal device may generate a measurement report (MeasurementReport). The RRC layer of the terminal device may send the measurement report to the PHY layer of the access network device by using the L2 layer and the PHY layer of the terminal device. After receiving the measurement report from the PHY layer of the terminal device, the PHY layer of the access network device may transfer the measurement report to the RRC layer of the access network device by using the L2 layer of the access network device.

It should be noted that the access network device may alternatively send the configuration information to the terminal device by using another message. This is not limited.

In addition to indicating the terminal device to perform gap-free measurement on the first cell, the configuration information may be used to indicate other information. For example, the configuration information may be used to indicate a second resource unit combination and a MIMO capability of each resource unit in the second resource unit combination.

The second resource unit combination includes the first resource unit after update, and the first resource unit after the update does not include a second resource unit, or a MIMO capability of a second resource unit in the first resource unit combination after the update is lower than a MIMO capability of a second resource unit in the first resource unit combination.

The second resource unit combination may be determined by the access network device and indicated only to the terminal device. The configuration information may include the second resource unit combination and the MIMO capability of each resource unit in the second resource unit combination.

It should be noted that the second resource unit combination and the MIMO capability of each resource unit in the second resource unit combination may be carried in the configuration information and sent to the terminal device, to reduce signaling overheads. Alternatively, the second resource unit combination and the MIMO capability of each resource unit in the second resource unit combination may be sent to the terminal device without carrying in the configuration information. For example, the access network device may send the second resource unit combination and the MIMO capability of each resource unit in the second resource unit combination to the terminal device by using separate signaling, to reduce power consumption caused by the terminal device for parsing signaling.

For example, the first resource unit combination is CA_1A-3A-7A, the second resource unit is a band 3, the first resource unit is a band 78, and the band 78 is a resource unit in NR. Therefore, the first resource unit combination after the update is CA_1A-7A.

For another example, the first resource unit combination is CA_1A-3A-7A, the second resource unit is a band 3, a MIMO capability of the first resource unit combination is 4R+4R+4R, the first resource unit is a band 78, the band 78 is a resource unit in NR, the second resource unit is a band 3, and a MIMO capability of the band 3 is 4R. In this case, the first resource combination after the update is CA_1A-3A-7A. A MIMO capability of the first resource unit combination after the update is 4R+2R+4R.

Specifically, for an implementation of the example, refer to FIG. 6.

In still another example, the configuration information may be used to indicate at least one resource unit, the at least one resource unit is included in a first resource unit combination, and the at least one resource unit includes a resource unit whose radio frequency channels can be used as radio frequency channels of a first resource unit, so that the terminal device selects a second resource unit from the at least one resource unit, uses some or all of radio frequency channels of the second resource unit as the radio frequency channels of the first resource unit.

For example, the first resource unit combination is CA_1A-3A-7A, and the at least one resource unit may include one or more of a band 1, a band 3, and a band 7. Alternatively, the at least one resource unit may include a band 3 and/or a band 7.

Operation 902: The terminal device determines radio frequency channels of the first resource unit based on the configuration information.

The radio frequency channels of the first resource unit are some or all of radio frequency channels of a second resource unit, the second resource unit is included in the first resource unit combination that is configured for the terminal device and in an active state, and the first resource unit combination includes one or more resource units in the active state.

It should be noted that, in this application, that a resource unit is in an active state may indicate that uplink and downlink signals may be received or sent on the resource unit. For example, the terminal device may send an uplink signal to the access network device on a radio frequency channel of a resource unit in an active state, and may receive a downlink signal from the access network device on the radio frequency channel of the resource unit in the active state.

For example, it is assumed that the resource unit combination that is configured for the terminal device and in the active state is CA_1A-3A-7A, and the resource units in the active state in the resource units may include a band 1, a band 3, and a band 7. When the second resource unit is one or more of the band 1, the band 3, and the band 7, the radio frequency channels of the first resource unit are some of the radio frequency channels of the second resource unit. When the second resource unit is the band 3 and/or the band 7, the radio frequency channels of the first resource unit are all of the radio frequency channels of the second resource unit.

For example, operation 902 may include the following two manners.

Manner 1: When the configuration information is used to indicate the second resource unit combination and the MIMO capability of each resource unit in the second resource unit combination, that the terminal device determines the radio frequency channels of the first resource unit based on the configuration information may include:

The terminal device compares the first resource unit combination with the second resource unit combination; and uses radio frequency channels of a resource unit included in the first resource combination but not included in the second resource combination as the radio frequency channels of the first resource unit; or uses some of radio frequency channels of a same resource unit with a different MIMO capability in the first resource combination and the second resource unit combination as the radio frequency channels of the first resource unit.

For example, the first resource unit combination is CA_1A-3A-7A, and the second resource unit combination is DC_1A-7A. The first resource unit combination includes a band 3. The second resource unit combination does not include the band 3. The terminal device may use all of radio frequency channels of the band 3 as the radio frequency channels of the first resource unit.

For another example, the first resource unit combination is CA_1A-3A-7A, and the second resource unit combination is DC_1A-3A-7A. In the first resource unit combination, a MIMO capability of a band 3 is 4R, and MIMO capabilities of a band 1 and a band 7 are both 4R. In the second resource unit combination, a MIMO capability of a band 3 is 2R, and MIMO capabilities of a band 1 and a band 7 are both 4R. The terminal device may use some of radio frequency channels of the band 3 as the radio frequency channels of the first resource unit.

Figure 11:
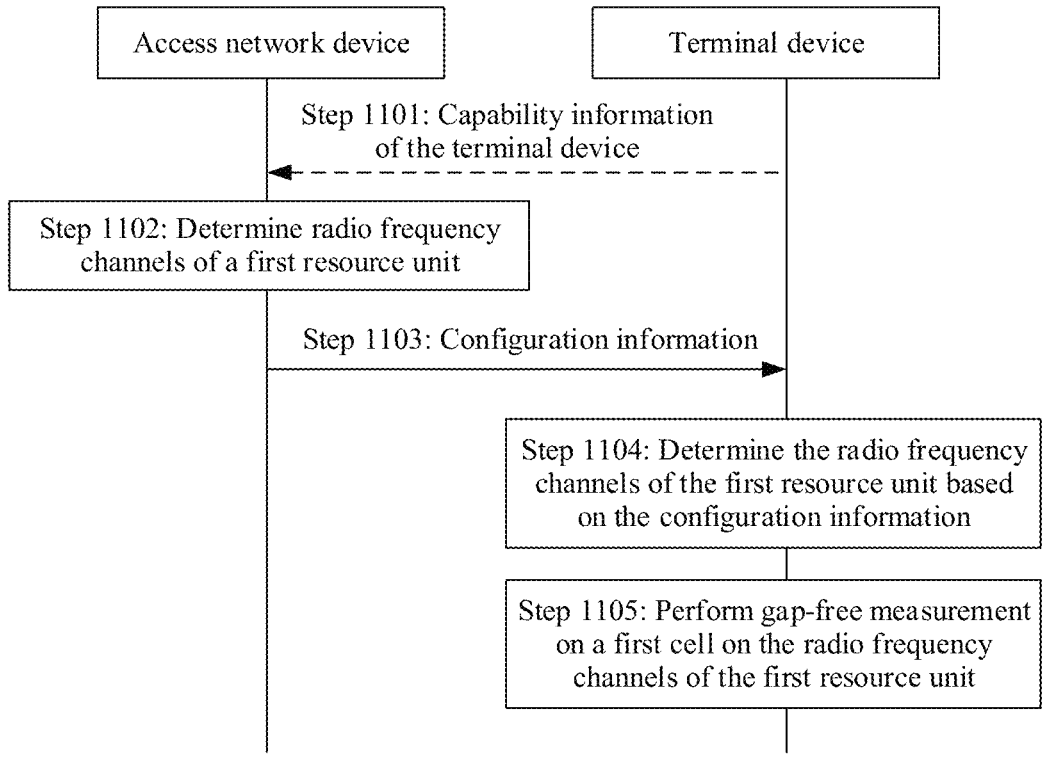
FIG. 11 is a flowchart of another gap-free measurement method according to an embodiment of this application.

Specifically, for Manner 1, refer to FIG. 11.

Manner 2: When the configuration information is used to indicate the at least one resource unit, that the terminal device determines the radio frequency channels of the first resource unit based on the configuration information may include the following Case 1 or Case 2.

Case 1: In an embodiment, the terminal device uses some of radio frequency channels of the at least one resource unit that meets one or more of the following Condition 1 to Condition 5 in the at least one resource unit as the radio frequency channels of the first resource unit.

Condition 1: The resource unit whose rank indication (RI) is less than or equal to a preset value in resource units in an active state.

The preset value may be a value that is preset. This is not limited. For example, the preset value may be 2.

With reference to the example in operation 902, the resource unit combination that is configured for the terminal device and in the active state is CA_1A-3A-7A. If an RI of the band 1 is 1, an RI of the band 3 is 2, and an RI of the band 7 is 4, the preset value is 2. The terminal device may use some of radio frequency channels of the band 1 as the radio frequency channels of the first resource unit.

Condition 2: The resource unit with the smallest bandwidth in resource units in an active state.

Still with reference to the example in the foregoing Condition 1, a bandwidth of the band 1 is greater than a bandwidth of the band 3, and the bandwidth of the band 3 is greater than a bandwidth of the band 7. The terminal device may use some of radio frequency channels of the band 7 as the radio frequency channels of the first resource unit.

Condition 3: The resource unit with the lowest signal quality in resource units in an active state.

The signal quality may include RSRP, RSRQ, a SINR, or another parameter. This is not limited.

Still with reference to the example in the foregoing Condition 1, if RSRP of the band 1 is greater than RSRP of the band 3, and the RSRP of the band 3 is greater than RSRP of the band 7, the terminal device may use some of radio frequency channels of the band 7 as the radio frequency channels of the first resource unit.

If RSRQ of the band 1 is greater than RSRQ of the band 3, and the RSRQ of the band 3 is greater than RSRP of the band 7, the terminal device may use some of radio frequency channels of the band 7 as the radio frequency channels of the first resource unit.

If a SINR of the band 1 is greater than a SINR of the band 3, and the SINR of the band 3 is greater than a SINR of the band 7, the terminal device may use some of radio frequency channels of the band 7 as the radio frequency channels of the first resource unit.

It should be noted that, if the RSRP of the band 1 is the smallest RSRP in the foregoing bands, the RSRP of the band 3 is the smallest RSRQ in the foregoing bands, and the SINR of the band 7 is the smallest SINR in the foregoing bands, the terminal device may use some of radio frequency channels of any one of the three bands as the radio frequency channels of the first resource unit, or the terminal device may select one band from the three bands based on a preset priority. For example, a priority of the RSRP is higher than a priority of the RSRQ, and the priority of the RSRQ is higher than a priority of the SINR. With reference to the foregoing descriptions, the terminal device may use some of the radio frequency channels of the band 1 as the radio frequency channels of the first resource unit. The preset priority is a priority that is preset. This is not limited.

Condition 4: The resource unit with the lowest data transmission rate in resource units in an active state.

Still with reference to the example in the foregoing Condition 1, if a data transmission rate of the band 1 is greater than a data transmission rate of the band 3, and the data transmission rate of the band 3 is greater than a data transmission rate of the band 7, the terminal device may use some of radio frequency channels of the band 7 as the radio frequency channels of the first resource unit.

Condition 5: The resource unit with the largest ID in resource units in an active state.

Still with reference to the example in the foregoing Condition 1, if the band 3 is a resource unit with the largest ID in the foregoing three bands, the terminal device may use some of radio frequency channels of the band 3 as the radio frequency channels of the first resource unit.

The terminal device may deactivate the at least one resource unit based on the configuration information, so that the terminal device stops performing data transmission with the serving cell on all of the radio frequency channels of the deactivated at least one resource unit. The terminal device may use all of the radio frequency channels of the at least one resource unit on which the terminal device stops performing data transmission with the serving cell as the radio frequency channels of the first resource unit.

For example, with reference to the example in operation 902, the resource unit combination that is configured for the terminal device and in the active state is CA_1A-3A-7A, and the at least one resource unit may include one or more of the band 3 and the band 7. The terminal device may deactivate the band 3 and/or the band 7. For example, the terminal device deactivates the band 3, and the terminal device may stop performing data transmission with the serving cell on the band 3. The terminal device may use all of the radio frequency channels of the band 3 as the radio frequency channels of the first resource unit.

Case 2: In an embodiment, the terminal device uses all of radio frequency channels of the second resource unit that meets one or more of the following Condition 6 to Condition 10 in the at least one resource unit as the radio frequency channels of the first resource unit.

Condition 6: The resource unit with the largest ID in resource units in an active state.

For specific descriptions of Condition 6, refer to the foregoing Condition 5. Details are not described herein again.

Condition 7: The resource unit with the lowest data transmission rate in resource units in an active state.

For specific descriptions of Condition 7, refer to the foregoing Condition 2. Details are not described herein again.

Condition 8: The resource unit with the lowest signal quality or the smallest RI in resource units in an active state.

The signal quality may include RSRP, RSRQ, a SINR, or another parameter. This is not limited. For specific descriptions of the RSRP, the RSRQ, or the SINR in the signal quality, refer to the foregoing Condition 3. For specific descriptions of the RI, refer to the foregoing Condition 1. Details are not described herein again.

Condition 9: The resource unit with the smallest bandwidth in resource units in an active state.

For specific descriptions of Condition 9, refer to the foregoing Condition 2. Details are not described herein again.

Condition 10: The resource unit with the largest MIMO capability in resource units in an active state.

Still with reference to the example in the foregoing Condition 1, a MIMO capability of the band 3 is 4R, a MIMO capability of the band 7 is 8R, and the terminal device may use all of radio frequency channels of the band 7 as the radio frequency channels of the first resource unit.

It should be noted that, if MIMO capabilities of a plurality of resource units in the resource unit combination that is configured for the terminal device and in the active state are the same, the terminal device may randomly or in a preset order use all of radio frequency channels of any one or more of the plurality of resource units as the radio frequency channels of the first resource unit.

The preset order may be preset. For example, the preset order is from left to right or from right to left. This is not limited. For example, the resource unit combination that is configured for the terminal device and in the active state is CA_1A-3A-7A, MIMO capabilities of the band 3 and the band 7 in the resource unit combination are the same, and the terminal device may use all of radio frequency channels of the band 3 and/or band 7 as the radio frequency channels of the first resource unit.

In this way, the terminal device may reduce the MIMO capability of the at least one resource unit, so that the terminal device stops performing data transmission with the serving cell on some of the radio frequency channels of the at least one resource unit. The terminal device may use some of the radio frequency channels on which the terminal device stops performing data transmission with the serving cell as the radio frequency channels of the first resource unit.

For example, with reference to the example in operation 902, the resource unit combination that is configured for the terminal device and in the active state is CA_1A-3A-7A, and the at least one resource unit may include one or more of the band 1, the band 3, and the band 7. A MIMO capability of each of the band 1, the band 3, and the band 7 is 4R. In other words, there are four radio frequency channels on which the terminal device performs data transmission with the serving cell on the band 1, the band 3, and the band 7.

The terminal device may reduce the MIMO capability of the band 1 from 4R to 2R; the terminal device may reduce the MIMO capability of the band 3 from 4R to 2R; and/or the terminal device may reduce the MIMO capability of the band 7 from 4R to 2R, so that a quantity of radio frequency channels on which the terminal device performs data transmission with the serving cell on the band 1 is reduced from four to two, a quantity of radio frequency channels on which the terminal device performs data transmission with the serving cell on the band 3 is reduced from four to two, and/or a quantity of radio frequency channels on which the terminal device performs data transmission with the serving cell on the band 7 is reduced from four to two. In this way, the terminal device may use, as the radio frequency channels of the first resource unit, two radio frequency channels, of the band 1, on which the terminal device stops performing data transmission with the serving cell; use, as the radio frequency channels of the first resource unit, two radio frequency channels, of the band 3, on which the terminal device performs data transmission with the serving cell; and/or use, as the radio frequency channels of the first resource unit, the two radio frequency channels, of the band 7, on which the terminal device performs data transmission with the serving cell.

Further optionally, in Manner 2, the terminal device may send a configuration completion response to the access network device, where the configuration completion response may be used to indicate the second resource unit, so that the access network device can determine, based on the configuration completion response, that the radio frequency channels of the first resource unit are all of the radio frequency channels of the second resource unit.

The configuration completion response may include an identity of the second resource unit. The configuration completion response may further include other information, for example, an identity of the terminal device. This is not limited.

It should be noted that, when some of the radio frequency channels of the second resource unit are used as the radio frequency channels of the first resource, the configuration completion response may be used to indicate the MIMO capability of the second resource unit, so that the access network device can determine, based on the configuration completion response, that the radio frequency channels of the first resource unit are some of the radio frequency channels of the second resource unit.

Figure 12:
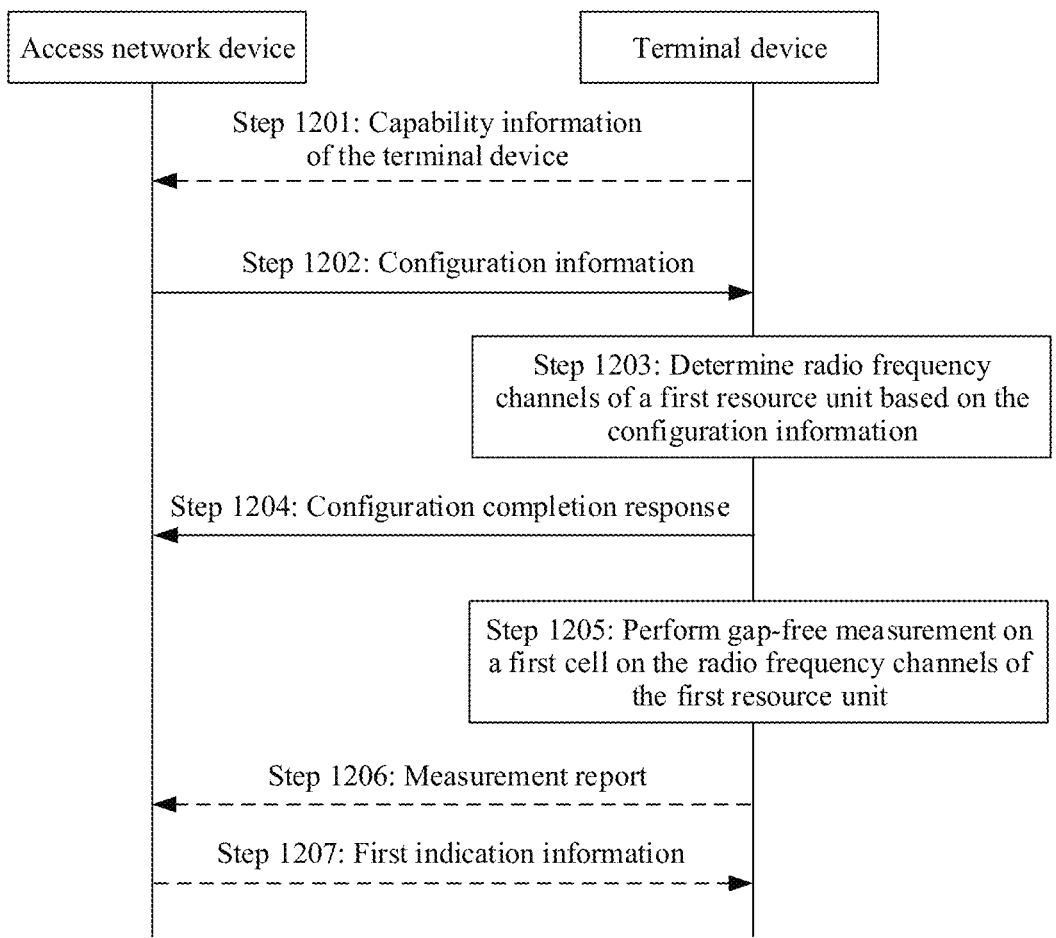
FIG. 12 is a flowchart of still another gap-free measurement method according to an embodiment of this application.

Specifically, for Manner 2, refer to the following description in FIG. 12.

Operation 903: The terminal device performs gap-free measurement on the first cell on the radio frequency channels of the first resource unit.

For example, the terminal device may continuously monitor the SSB on the radio frequency channels of the first resource unit in a preset time.

The preset time may be set to be greater than or equal to the SSB period of the first cell.

In an example, the preset time may be an SMTC period.

In this embodiment of this application, because the SMTC period is greater than the SSB period, in the SMTC period, the terminal device may receive the signal from the neighboring cell of the serving cell, that is, the terminal device may perform gap-free measurement on the neighboring cell of the serving cell. This resolves a problem in the conventional technology that the terminal device cannot measure the neighboring cell of the serving cell within a measurement gap of 6 ms.

It should be noted that the method shown in FIG. 9 is described by using an example in which the terminal device performs gap-free measurement on the first cell or the first resource unit in the first cell. It may be understood that, with reference to the method shown in FIG. 9, the terminal device may perform gap-free measurement on a plurality of resource units to be measured. Details are not described again. For example, the terminal device may perform, with reference to the method shown in FIG. 9, gap-free measurement on the resource units to be measured in the cell 1.1, the cell 1.2, the cell 2.1, and the cell 2.2 in FIG. 6.

In the gap-free measurement method provided in this embodiment of this application, after the terminal device receives the configuration information used to indicate to perform, on the first resource unit, gap-free measurement on the neighboring cell of the serving cell of the terminal device, the terminal device can determine, based on the configuration information, that some or all of the radio frequency channels of the second resource unit in the resource units in the first resource unit combination that is configured for the terminal device and in the active state are the radio frequency channels of the first resource unit. In this way, the terminal device can receive the signal from the neighboring cell on the radio frequency channels of the first resource unit. This resolves the problem in the conventional technology that the terminal device cannot perform gap-free measurement on the neighboring cell because there is no radio frequency channel to receive the signal from the neighboring cell.

Optionally, in a first implementation of the method shown in FIG. 9, the method further includes:

The access network device sends first query information to the terminal device. Correspondingly, the terminal device receives the first query information from the access network device.

The first query information is used to query capability information of the terminal device. The capability information of the terminal device may include a resource unit combination supported by the terminal device and a MIMO capability corresponding to each resource unit in the resource unit combination supported by the terminal device. A capability of the resource unit combinations supported by the terminal device is a set of all resource unit combinations supported by the terminal device.

For example, the resource unit combinations supported by the terminal device include CA_1A-3A-7A, DC_1A-3A_n78A, DC_1A-7A_n78A, and DC 3A-7A_n78. In other words, capabilities of the resource unit combinations supported by the terminal device are CA_1A-3A-7A, DC_1A-3A_n78A, DC_1A-7A_n78A, and DC 3A-7A_n78.

For another example, a MIMO capability of the resource unit combination CA_1A-3A-7A supported by the terminal device is 4R+4R+4R. In other words, the resource unit combination includes a band 1, a band 3, and a band 7. A MIMO capability corresponding to the band 1 is 4R, a MIMO capability corresponding to the band 3 is 4R, and a MIMO capability corresponding to the band 7 is 4R.

For example, the first query information may be RRC information. For example, the first query information is terminal device capability inquiry (UE Capability Inquiry). The terminal device may return the capability information of the terminal device to the access network device by using RRC response information, for example, capability information of the terminal device (UE Capability Information).

The RRC response information may include a plurality of information elements, and each information element may carry capability information of one or more terminal devices.

For example, an LTE CA combination supported by the terminal device and a MIMO capability of each resource unit in the LTE CA combination may be included in an information element UE-EUTRA-Capability; an NR CA combination supported by the terminal device and a MIMO capability of each resource unit in the NR CA combination may be included in an information element UE-NR-Capability; and an EN-DC combination supported by the terminal device and a MIMO capability of each resource unit in the EN-DC combination are included in an information element UE-MRDC-Capability.

Based on this implementation, the access network device can obtain the capability information of the terminal device by exchanging signaling with the terminal device, which is simple and easy to implement.

Optionally, in a second implementation of the method shown in FIG. 9, the method further includes:

When the radio frequency channels of the first resource unit are some of the radio frequency channels of the second resource unit, the access network device and the terminal device receive or send uplink and downlink signals on the second resource unit based on reduced MIMO capability.

Based on this implementation, the terminal device can receive signals from the neighboring cell on some of the radio frequency channels of the second resource unit, and further, the terminal device can perform gap-free measurement on the neighboring cell.

When the radio frequency channels of the first resource unit are all of the radio frequency channels of the second resource unit, the access network device and the terminal device stop receiving or sending uplink and downlink signals on the second resource unit.

In this implementation, the terminal device can receive signals from the neighboring cell on all of the radio frequency channels of the second resource unit, and further, the terminal device can perform gap-free measurement on the neighboring cell.

Optionally, in a third implementation of the method shown in FIG. 9, the method further includes:

The terminal device sends the measurement report to the access network device. Correspondingly, the access network device receives the measurement report from the terminal device.

In this embodiment of this application, the terminal device can send the measurement report to the access network device when measurement performed by the terminal device on the neighboring cell and the serving cell meets a measurement trigger condition, or measurement duration of the terminal device is greater than or equal to a preset measurement period.

The measurement trigger condition may be a preset condition. For example, signal quality of the neighboring cell is stronger than signal quality of the serving cell, or signal quality of the serving cell is lower than a first preset threshold, or signal quality of the neighboring cell is greater than a second preset threshold. The first preset threshold and the second preset threshold may be preset thresholds. This is not limited.

The preset measurement period may be a preset time length. This is not limited.

In this implementation, the access network device can accurately determine, based on the measurement report, whether the terminal device needs to perform cell handover. This avoids affecting use of the terminal device when the signal quality of the serving cell of the terminal device is relatively poor.

With reference to the system shown in FIG. 6, the method shown in FIG. 9 is described in detail below by using an example in which the access network device determines the radio frequency channels of the first resource unit and indicates the radio frequency channels to the terminal device.

FIG. 11 is a flowchart of a gap-free measurement method according to an embodiment of this application. As shown in FIG. 11, the method may include the following operations.

Operation 1101: A terminal device sends capability information of the terminal device to an access network device. Correspondingly, the access network device receives the capability information from the terminal device.

For specific descriptions of the capability information of the terminal device, refer to the description of the capability information of the terminal device in operation 902. Details are not described herein again.

Operation 1102: The access network device determines radio frequency channels of a first resource unit.

For the radio frequency channels of the first resource unit, refer to the description of the radio frequency channels of the first resource unit in operation 902. Details are not described herein again.

For example, operation 1102 may include the following two cases.

Case 3: The access network device uses some of radio frequency channels of a second resource unit that meets one or more of the following conditions as the radio frequency channels of the first resource unit:

Condition 11: The resource unit whose RI is less than or equal to a preset value in resource units in an active state.

Condition 12: The resource unit with the smallest bandwidth in resource units in an active state.

Condition 13: The resource unit with the smallest RSRP, RSRQ, or SINR in resource units in an active state.

Condition 14: The resource unit with the lowest data transmission rate in resource units in an active state.

Condition 15: The resource unit with the largest ID in resource units in an active state.

For details of Condition 11 to Condition 15, refer to Condition 1 to Condition 5. Details are not described herein again.

Case 4: The access network device uses all of radio frequency channels of a second resource unit that meets one or more of the following conditions as the radio frequency channels of the first resource unit:

Condition 16: The resource unit with the largest ID in resource units in an active state.

Condition 17: The resource unit with the lowest data transmission rate in resource units in an active state.

Condition 18: The resource unit with the lowest signal quality in resource units in an active state.

The signal quality may include RSRP, RSRQ, a SINR. This is not limited.

Condition 19: The resource unit with the smallest bandwidth in resource units in an active state.

Condition 20: The resource unit with the smallest MIMO capability in resource units in an active state.

For details of Condition 16 to Condition 20, refer to Condition 6 to Condition 10. Details are not described herein again.

In a possible embodiment, operation 1102 may be implemented by using the following operations.

Operation 11021: The access network device determines the radio frequency channels of the first resource unit based on the capability information of the terminal device.

Further, when the access network device determines that a capability of a third resource unit combination is greater than that of a resource unit combination supported by the terminal device, or when the access network device determines that a MIMO capability of the third resource unit combination is greater than a MIMO capability of a resource unit combination supported by the terminal device, the access network device determines, based on the capability information of the terminal device, the radio frequency channels of the first resource unit.

The third resource unit combination is a resource unit combination obtained after the first resource unit is added to the first resource unit combination.

It should be noted that, that the capability of the third resource unit combination is greater than that of the resource unit combination supported by the terminal device indicates that the third resource unit combination is not included in the resource unit combination supported by the terminal device.

With reference to a specific example, that the capability of the third resource unit combination is greater than that of the resource unit combination supported by the terminal device and that the MIMO capability of the third resource unit combination is greater than the MIMO capability of the resource unit combination supported by the terminal device are described below.

1. The capability of the third resource unit combination is greater than that of the resource unit combination supported by the terminal device.

In an example, capabilities of the resource combinations supported by the terminal device are CA_1A-3A-7A, DC_1A-3A_n78A, DC_1A-7A_n78A, and DC 3A-7A_n78. A resource combination that is not supported by the terminal device is DC_3A-7A_n78 n67.

For example, if the first resource unit is n67, and the first resource unit combination is DC 3A-7A_n78, the third resource unit combination is DC 3A-7A_n78 n67. The third resource unit combination is not included in the resource unit combination that is not supported by the terminal device. In other words, the third resource unit combination is greater than the resource unit combination supported by the terminal device.

For example, if the first resource unit is n78, and the first resource unit combination is CA_1A-3A, the third resource unit combination is DC_1A-3A_n78. The third resource unit combination is included in the resource combination supported by the terminal device. In other words, the capability of the third resource unit combination is less than or equal to that of the resource unit combination supported by the terminal device.

2. The MIMO capability of the third resource unit is greater than the MIMO capability of the resource unit combination supported by the terminal device.

In an example, the resource unit combinations supported by the terminal device include CA_1A-3A-7A and DC_1A-3A-7A_n78A. A MIMO capability combination of CA_1A-3A-7A is 4R+4R+4R. A MIMO capability combination of DC_1A-3A-7A_n78A is 4R+2R+2R+4R, 2R+4R+2R+4R, or 2R+2R+4R+4R.

For example, the first resource unit is n78, and the MIMO capability of the first resource unit is 2R. The first resource unit combination is CA_1A-3A-7A, and the MIMO capability of the first resource unit combination is 4R+4R+4R. In this case, the third resource unit combination is DC_1A-3A-7A_n78A, and the MIMO capability of the third resource unit combination is 4R+4R+4R+2R. The MIMO capability of the third resource unit combination is greater than the MIMO capability of the resource unit combination supported by the terminal device.

In this embodiment of this application, because the terminal device supports a relatively large quantity of resource unit combinations, if the resource combination corresponding to the terminal device obtained by the access network device is not all the resource combinations supported by the terminal device, when the access network device determines the radio frequency channels of the first resource unit based on the radio frequency channels of the second resource units, the determined radio frequency channels of the first resource unit may not be optimal.

Operation 1103: The access network device sends configuration information to the terminal device. Correspondingly, the terminal device receives the configuration information from the access network device.

For a specific description of operation 1103, refer to the foregoing operation 901. Details are not described herein again.

Operation 1104: The terminal device determines the radio frequency channels of the first resource unit based on the configuration information.

For a specific description of operation 1104, refer to the foregoing operation 902. Details are not described herein again.

Operation 1105: The terminal device performs gap-free measurement on a first cell on the radio frequency channels of the first resource unit.

For a specific description of operation 1105, refer to the foregoing operation 903. Details are not described herein again.

It should be noted that operation 1101 in FIG. 11 is an optional operation, and operation 1102, operation 1103, operation 1104, and operation 1150 are mandatory operations.

With reference to the system shown in FIG. 6, the following describes in detail the method shown in FIG. 9 by using Manner 2 in FIG. 9 as an example.

FIG. 12 is a flowchart of a gap-free measurement method according to an embodiment of this application. As shown in FIG. 12, the method may include the following operations.

Operation 1201: A terminal device sends capability information of the terminal device to an access network device. Correspondingly, the terminal device receives the capability information from the terminal device.

For a specific description of operation 1201, refer to the foregoing operation 1101. Details are not described herein again.

Operation 1202: The access network device sends configuration information to the terminal device. Correspondingly, the terminal device receives the configuration information from the access network device.

For a specific description of operation 1202, refer to the foregoing operation 901. Details are not described herein again.

Operation 1203: The terminal device determines radio frequency channels of a first resource unit based on the configuration information.

For a specific description of operation 1203, refer to the foregoing operation 902. Details are not described herein again.

Operation 1204: The terminal device sends a configuration completion response to the access network device. Correspondingly, the access network device receives the configuration completion response from the terminal device The configuration completion response is used to indicate a second resource unit. The configuration completion response may include an identity of the second resource unit. The configuration completion response may further include other information, for example, an identity of the terminal device. This is not limited.

In this embodiment of this application, when the radio frequency channels of the first resource unit are all of radio frequency channels of the second resource unit, the configuration completion response may include the identity of the second resource unit; or when the radio frequency channels of the first resource unit are some of radio frequency channels of the second resource unit, the configuration completion response may include the identity of the second resource unit and a MIMO capability of the second resource unit. The MIMO capability of the second resource unit is a reduced MIMO capability of the second resource unit.

The identity of the second resource unit is used to uniquely identify the second resource unit, so that the access network device can obtain the second resource unit based on the identity of the second resource unit. For example, the identity of the second resource unit may be a number or a character, or may be a combination of a number and a character, a bitmap (bit), or the like. This is not limited.

For example, an identity of the first resource unit is n78, and the identity of the second resource unit is 3A. When the radio frequency channels of the first resource unit are all of the radio frequency channels of the second resource unit, the configuration completion response may include 3A.

For example, a first resource unit combination is DC_1A-3A-7A. When the radio frequency channels of the first resource unit are all of the radio frequency channels of the second resource unit, a bit of a bitmap is used to represent each resource unit in the first resource unit combination. When the bit is set to 1, it indicates that a corresponding resource unit is the second resource unit. If the second resource unit is 7A, the configuration completion response includes the bitmap 001.

For example, the reduced MIMO capability of the second resource unit may be a number, a combination of a number and a character, or a bitmap. This is not limited.

For example, the identity of the first resource unit is n78, and the identity of the second resource unit is 3A. When the radio frequency channels of the first resource unit are some of the radio frequency channels of the second resource unit, the configuration completion response may include 3A {2R} or 3A {2}. 2R or 2 indicates that the reduced MIMO capability of the second resource unit 3A is 2R.

For example, a first resource unit combination is DC_1A-3A-7A. When the radio frequency channels of the first resource unit are some of the radio frequency channels of the second resource unit, a bit of a bitmap is used to represent each resource unit in the first resource unit combination. If a bit is set to 1, the MIMO capability of the corresponding resource unit decreases to 2R. If the second resource unit is 7A, the configuration completion response includes the bitmap 001.

In this implementation, in this embodiment of this application, the terminal device sends, to the access network device, the configuration completion response used to indicate the second resource unit, so that the access network device determines the second resource unit and the MIMO capability of the second resource unit based on the configuration completion response. This avoids a problem that the terminal device is not synchronized with the access network device because the access network device sends a signal to the terminal device on the second resource unit, or sends, to the terminal device on the second resource unit, signaling that exceeds the MIMO capability of the second resource unit.

Operation 1205: The terminal device performs gap-free measurement on a first cell on the radio frequency channels of the first resource unit.

For a specific description of operation 1205, refer to the foregoing operation 903. Details are not described herein again.

Operation 1206: The terminal device sends a measurement report to the access network device. Correspondingly, the access network device receives the measurement report from the terminal device.

For a specific description of operation 1206, refer to the third implementation shown in FIG. 9. Details are not described herein again.

Operation 1207: The access network device sends first indication information to the terminal device. Correspondingly, the terminal device receives the first indication information from the access network device.

The first indication information is used to indicate the terminal device to hand over from a serving cell to the first cell.

In this embodiment of this application, after receiving the measurement report from the terminal device, the access network device may determine, based on the measurement report, whether to indicate the terminal device to perform cell handover.

For example, the access network device may determine, based on signal quality of the first cell in the measurement report, whether to indicate the terminal device to perform cell handover. For example, when the signal quality of the first cell is higher than signal quality of the serving cell, the access network device may determine to indicate the terminal device to perform cell handover, for example, indicate the terminal device to hand over from the serving cell to the first cell.

After the access network device receives measurement results of a plurality of neighboring cells sent by the terminal device, the access network device may determine, based on the measurement results of the plurality of neighboring cells, to indicate the terminal device to hand over to a target neighboring cell. The target neighboring cell may be one of the plurality of neighboring cells. For example, the target neighboring cell may be a cell with the best signal quality in the plurality of neighboring cells, or the target neighboring cell may be a cell with the highest priority in the plurality of neighboring cells, or the target neighboring cell may be a cell with minimum load in the plurality of neighboring cells, or the target cell is a cell with the largest bandwidth in the plurality of neighboring cells. This is not limited.

In an embodiment, when the access network device determines that a measurement result of the first cell meets a preset condition, the access network device sends the first indication information to the terminal device.

The preset condition may be a condition pre-configured by the access network device. For example, the preset condition may be that the signal quality of the first cell is higher than the signal quality of the serving cell.

In a possible embodiment, after the access network device determines that the terminal device is handed over to the first cell, the access network device and the terminal device activate the second resource unit, and restore the MIMO capability of the second resource unit.

Based on this technical solution, in this embodiment of this application, the access network device activates the second resource unit and restores the MIMO capability of the second resource unit, so that the access network device does not affect subsequent measurement on another neighboring cell of the serving cell of the terminal device.

It should be noted that operation 1201, operation 1206, and operation 1207 in FIG. 12 are optional operations, and operation 1202 to operation 1205 are mandatory operations.

The solutions in the foregoing embodiments of this application may be combined on a premise that there is no contradiction.

In the foregoing embodiments provided in this application, the method provided in embodiments of this application is described from perspectives of the access network device, the terminal device, and interaction between the access network device and the terminal device. It may be understood that, to implement the functions in the method provided in the foregoing embodiments of this application, each network element such as the access network device or the terminal device includes a corresponding hardware structure and/or software module for performing the functions. A person of ordinary skill in the art should easily be aware that, in combination with algorithms and operations in the examples described in embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, functional modules of the access network device and the terminal device may be divided based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used.

Figure 13:
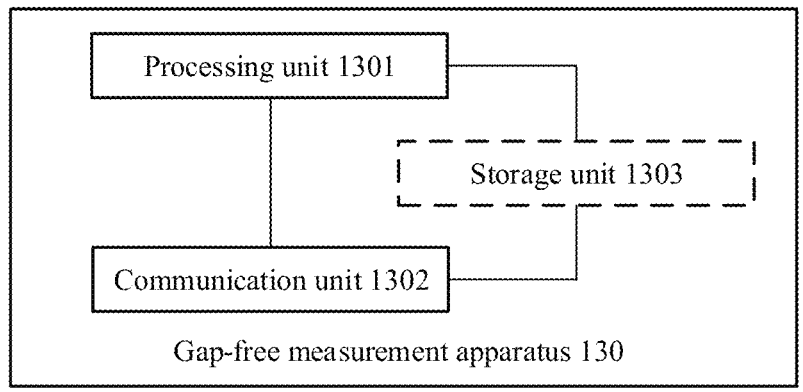
FIG. 13 is a schematic diagram of composition of a gap-free measurement apparatus according to an embodiment of this application.

When an integrated unit is used, FIG. 13 is a schematic diagram of a possible structure of a gap-free measurement apparatus (denoted as a gap-free measurement apparatus 130) in the foregoing embodiments. The gap-free measurement apparatus 130 includes a communication unit 1302 and a processing unit 1301, and may further include a storage unit 1303. The schematic diagram of the structure shown in FIG. 13 may be used to show a structure of the terminal device in the foregoing embodiments.

When the schematic diagram of the structure shown in FIG. 13 is used to show the structure of the terminal device in the foregoing embodiments, the processing unit 1301 is configured to control and manage actions of the terminal device. For example, the processing unit 1301 is configured to perform operation 902 and operation 903 in FIG. 9, and operation 1104 and operation 1105 in FIG. 11. The communication unit 1302 performs operation 1101 in FIG. 11, operation 1201 and operation 1304 in FIG. 11, and/or an action performed by the terminal device in another process described in embodiments of this application. The processing unit 1301 may communicate with another network entity by using the communication unit 1302, for example, communicate with the access network device 1 shown in FIG. 6. The storage unit 1303 is configured to store program code and data of the terminal device.

When the schematic diagram of the structure shown in FIG. 13 is used to show the structure of the terminal device in the foregoing embodiments, the gap-free measurement apparatus 130 may be a terminal device, or may be a chip in the terminal device.

When the gap-free measurement apparatus 130 is the terminal device, the processing unit 1301 may be a processor or a controller. The communication unit 1302 may be a communications interface, a transceiver, a transceiver machine, a transceiver circuit, a transceiver apparatus, or the like. The communications interface is a collective term, and may include one or more interfaces. The storage unit 1303 may be a memory. When the gap-free measurement apparatus 130 is the chip in the terminal device, the processing unit 1301 may be a processor or a controller. The communication unit 1302 may be an input interface and/or an output interface, a pin, a circuit, or the like. The storage unit 1303 may be a storage unit (for example, a register or a cache) in the chip, or may be a storage unit (for example, a read-only memory (ROM for short) or a random access memory (RAM for short)) outside the chip and in the terminal device or the first access network device.

Figure 14:
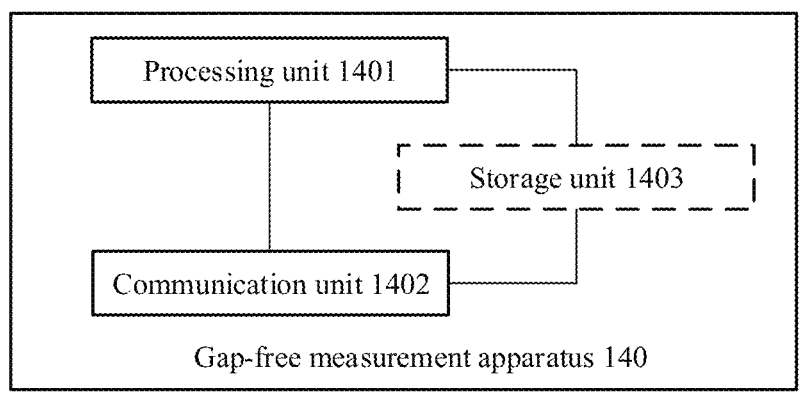
FIG. 14 is a schematic diagram of another composition of a gap-free measurement apparatus according to an embodiment of this application.

When an integrated unit is used, FIG. 14 is a schematic diagram of a possible structure of a gap-free measurement apparatus (denoted as a gap-free measurement apparatus 140) in the foregoing embodiments. The gap-free measurement apparatus 140 includes a communication unit 1402, and may further include a processing unit 1401 and a storage unit 1403. The schematic diagram of the structure shown in FIG. 14 may be used to show a structure of the access network device in the foregoing embodiments.

When the schematic diagram of the structure shown in FIG. 14 is used to show the structure of the access network device in the foregoing embodiments, the processing unit 1401 is configured to control and manage an action of the access network device. For example, the processing unit 1401 is configured to perform, by using the communication unit 1402, operation 901 in FIG. 9, operation 1103 in FIG. 11, operation 1202, operation 1206, and operation 1207 in FIG. 12, and/or an action performed by the access network device in another process described in embodiments of this application. The processing unit 901 may communicate with another network entity by using the communication unit 1402, for example, communicate with the terminal device shown in FIG. 6. The storage unit 1403 is configured to store program code and data of the first access network device.

When the schematic diagram of the structure shown in FIG. 14 is used to show the structure of the access network device in the foregoing embodiments, the gap-free measurement apparatus 140 may be the access network device, or may be a chip in the access network device.

When the gap-free measurement apparatus 140 is the first access network device, the processing unit 1401 may be a processor or a controller. The communication unit 1402 may be a communications interface, a transceiver, a transceiver machine, a transceiver circuit, a transceiver apparatus, or the like. The communications interface is a collective term, and may include one or more interfaces. The storage unit 1403 may be a memory. When the gap-free measurement apparatus 140 is the chip in the first access network device, the processing unit 1401 may be a processor or a controller. The communication unit 1402 may be an input interface and/or an output interface, a pin, a circuit, or the like. The storage unit 1403 may be a storage unit (for example, a register or a cache) in the chip, or may be a storage unit (for example, a read-only memory (for short) or a random access memory (RAM for short)) outside the chip and in the terminal device or the first access network device.

The communication unit may also be referred to as a transceiver unit. Antennas and control circuits that are in the gap-free measurement apparatus 130 and the gap-free measurement apparatus 140 and that have a transceiver function may be considered as a communication unit of the gap-free measurement apparatus. A processor that has a processing function may be considered as a processing unit of the gap-free measurement apparatus. Optionally, a component that is in the communication unit and that is configured to implement a receiving function may be considered as a receiving unit. The receiving unit is configured to perform a receiving operation in embodiments of this application. The receiving unit may be a receiver, a receiver machine, a receiver circuit, or the like. A component that is in the communication unit and that is configured to implement a sending function may be considered as a sending unit. The sending unit is configured to perform a sending operation in embodiments of this application. The sending unit may be a transmitter, a transmitter machine, a transmitter circuit, or the like.

When integrated units in FIG. 13 and FIG. 14 each are implemented in a form of a software functional module and sold or used as an independent product, the integrated units may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions to enable a computer device (which may be a personal computer, a server, a first access network device, or the like) or a processor to perform all or some of the operations of the methods described in embodiments of this application. The storage medium storing the computer software product includes any medium that can store program code, such as a USB flash drive, a removable hard disk, a read-only memory, a random access memory, a magnetic disk, or an optical disc.

The units in FIG. 13 and FIG. 14 may alternatively be referred to as modules. For example, the processing unit may be referred to as a processing module.

Figure 15:
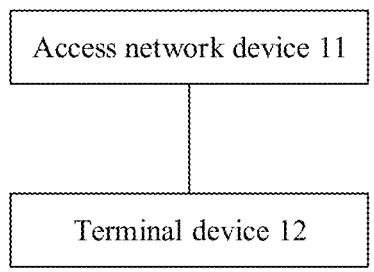
FIG. 15 is a schematic diagram of another simplified architecture of a communications system according to an embodiment of this application.

FIG. 15 is a diagram of an example of a communications system according to an embodiment of this application. The communications system includes an access network device 11 and a terminal device 12.

The access network device 11 is configured to perform an action performed by the access network device in the foregoing embodiments. For example, the access network device 11 is configured to perform operation 901 in FIG. 9, operation 1102 and operation 1103 in FIG. 11, and operation 1204, operation 1206, and operation 1207 in FIG. 12.

The terminal device 12 is configured to perform an action performed by the terminal device in the foregoing embodiments. For example, the terminal device 12 is configured to perform operation 902 and operation 903 in FIG. 9, operation 1101, operation 1104, and operation 1105 in FIG. 11, and operation 1203, operation 1204, and operation 1205 in FIG. 12.

In an implementation process, operations of the methods in embodiments may be completed by using a hardware integrated logical circuit in the processor, or by using instructions in a form of software. Operations of the methods disclosed with reference to embodiments of this application may be directly executed and accomplished by using a hardware processor, or may be executed and accomplished by using a combination of hardware and software modules in the processor.

The processor in this application may include but is not limited to at least one of the following computing devices that run software: a central processing unit (CPU), a microprocessor, a digital signal processor, a microcontroller unit (MCU), or an artificial intelligence processor. Each computing device may include one or more cores configured to perform an operation or processing by executing software instructions. The processor may be an independent semiconductor chip, or may be integrated with another circuit to form a semiconductor chip. For example, a SoC may include the processor and another circuit (for example, a codec circuit, a hardware acceleration circuit, or various buses and interface circuits). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed to a computer. However, the memory is not limited thereto.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communications system, including the foregoing access network device and terminal device.

An embodiment of this application further provides a chip. The chip includes a processor and an interface circuit, where the interface circuit is coupled to the processor. The processor is configured to run computer programs or instructions, to implement the foregoing method. The interface circuit is used to communicate with another module outside the chip.

All or some of foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD for short)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising (comprising)" does not exclude another component or another operation, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A gap-free measurement method, wherein the gap-free measurement method comprises:
   receiving, by a terminal device, configuration information from an access network device, wherein the configuration information is used to indicate the terminal device to perform gap-free measurement on a first cell, and the first cell is a neighboring cell of a serving cell of the terminal device;
   determining, by the terminal device, radio frequency channels of a first resource unit based on the configuration information, wherein the first resource unit is a resource unit to be measured in the first cell, wherein the radio frequency channels of the first resource unit are some or all of radio frequency channels of a second resource unit, and wherein the second resource unit is comprised in resource units of a first resource unit combination that is configured for the terminal device and the resources units of the first resource unit combination are in an active state; and
   performing, by the terminal device, gap-free measurement on the first cell on the radio frequency channels of the first resource unit.

2. The gap-free measurement method according to claim 1, wherein the configuration information is further used to indicate resource units of a second resource unit combination and a multiple-input multiple-output (MIMO) capability of each resource unit in the second resource unit combination; and
   wherein the second resource unit combination comprises the first resource unit combination after update, and the first resource unit combination after the update does not comprise the second resource unit, or a MIMO capability of the second resource unit in the first resource unit combination after the update is lower than a MIMO capability of the second resource unit in the first resource unit combination before the update.

3. The gap-free measurement method according to claim 2, wherein the gap-free measurement method further comprises:
   sending, by the terminal device, capability information of the terminal device to the access network device, wherein the capability information of the terminal device comprises a resource unit combination supported by the terminal device and a MIMO capability of each resource unit in the resource unit combination supported by the terminal device.

4. The gap-free measurement method according to claim 1, wherein the configuration information is further used to indicate at least one resource unit, the at least one resource unit is comprised in the first resource unit combination, and the at least one resource unit comprises a resource unit whose radio frequency channels can be used as the radio frequency channels of the first resource unit.

5. The gap-free measurement method according to claim 4, wherein the determining, by the terminal device, the radio frequency channels of the first resource unit based on the configuration information comprises:
   using, by the terminal device, all of the radio frequency channels of the second resource unit that each meet one or more of the following conditions as the radio frequency channels of the first resource unit:
   that the second resource unit is a resource unit with a largest identity (ID) in resource units in an active state;
   that the second resource unit is a resource unit with a lowest data transmission rate in the resource units;
   that the second resource unit is a resource unit with a smallest reference signal received power RSRP, reference signal received quality RSRQ, signal to interference plus noise ratio SINR, or rank indication RI in the resource units;
   that the second resource unit is a resource unit with a smallest bandwidth in the resource units; or that the second resource unit is a resource unit with a smallest MIMO capability in the resource units.

6. The gap-free measurement method according to claim 4, wherein the determining, by the terminal device, the radio frequency channels of the first resource unit based on the configuration information comprises:
   using, by the terminal device, some of the radio frequency channels of the second resource unit that each meet one or more of the following conditions as the radio frequency channels of the first resource unit:
   that the second resource unit is a resource unit whose RI is less than or equal to a preset value in resource units in an active state;

that the second resource unit is a resource unit with a smallest bandwidth in the resource units in an active state;

that the second resource unit is a resource unit with a smallest RSRP, RSRQ, or SINR in the resource units;

that the second resource unit is a resource unit with a lowest data transmission rate in the resource units; or that the second resource unit is a resource unit with a largest ID in the resource units.

7. The gap-free measurement method according to claim 4, wherein the gap-free measurement method further comprises:

sending, by the terminal device, a configuration completion response to the access network device, wherein the configuration completion response is used to indicate the second resource unit and/or a MIMO capability of the second resource unit.

8. The gap-free measurement method according to claim 1, wherein the performing, by the terminal device, the gap-free measurement on the first cell on the radio frequency channels of the first resource unit comprises:

continuously monitoring, by the terminal device, a synchronization signal block (SSB) on the radio frequency channels of the first resource unit in a preset time, wherein the preset time is greater than an SSB period of the first cell.

9. The gap-free measurement method according to claim 8, wherein the preset time is an SSB measurement time configuration SMTC period.

10. The gap-free measurement method according to claim 1, wherein the gap-free measurement method further comprises:

when the radio frequency channels of the first resource unit are some of the radio frequency channels of the second resource unit, receiving or sending, by the terminal device, uplink and downlink signals on the second resource unit by using a reduced MIMO capability; or when the radio frequency channels of the first resource unit are all of the radio frequency channels of the second resource unit, stopping, by the terminal device, receiving or sending uplink and downlink signals on the second resource unit.

11. A gap-free measurement method, wherein the gap-free measurement method comprises:

determining, by an access network device, radio frequency channels of a first resource unit, wherein the first resource unit is a resource unit to be measured in a first cell, the first cell is a neighboring cell of a serving cell of a terminal device, the radio frequency channels of the first resource unit are some or all of radio frequency channels of a second resource unit, and the second resource unit is comprised in resource units of a first resource unit combination that is configured for the terminal device and the resource units of the first resource unit combination are in an active state; and sending, by the access network device, configuration information to the terminal device, wherein the configuration information is used to indicate the terminal device to perform gap-free measurement on the first cell and used to indicate resource units of a second resource unit combination and a multiple-input multiple-output MIMO capability of each resource unit in the second resource unit combination, the resource units of the second resource unit combination comprise the resource units of the first resource unit combination after update, and the resource units of the first resource unit combination after the update does not comprise the second resource unit; or a MIMO capability of the second resource unit in the first resource unit combination after the update is lower than a MIMO capability of the second resource unit in the first resource unit combination before the update.

12. The gap-free measurement method according to claim 11, wherein the determining, by an access network device, the radio frequency channels of the first resource unit comprises:

using, by the access network device, all of the radio frequency channels of the second resource unit that each meet one or more of the following conditions as the radio frequency channels of the first resource unit:

that the second resource unit is a resource unit with a largest identity ID in the resource units;

that the second resource unit is a resource unit with a lowest data transmission rate in the resource units;

that the second resource unit is a resource unit with a smallest reference signal received power RSRP, reference signal received quality RSRQ, signal to interference plus noise ratio SINR, or rank indication RI in the resource units;

the second resource unit is a resource unit with a smallest bandwidth in the resource units; or the second resource unit is a resource unit with a smallest MIMO capability in the resource units.

13. The gap-free measurement method according to claim 11, wherein the determining, by an access network device, the radio frequency channels of the first resource unit in the first cell comprises:

using, by the access network device, some of the radio frequency channels of the second resource unit that each meet one or more of the following conditions as the radio frequency channels of the first resource unit:

that the second resource unit is a resource unit whose RI is less than or equal to a preset value in resource units in an active state;

that the second resource unit is a resource unit with a smallest bandwidth in resource units in an active state;

that the second resource unit is a resource unit with the smallest RSRP, RSRQ, or SINR in resource units in an active state;

that the second resource unit is a resource unit with a lowest data transmission rate in resource units in an active state; or that the second resource unit is a resource unit with a largest ID in resource units in an active state.

14. The gap-free measurement method according to claim 11, wherein the determining, by an access network device, the radio frequency channels of the first resource unit comprises:

when the access network device determines that a capability of resource units of a third resource unit combination is greater than that of a resource unit combination supported by the terminal device, or when the access network device determines that a MIMO capability of a third resource unit combination is greater than a MIMO capability of a resource unit combination supported by the terminal device, determining the radio frequency channels of the first resource unit based on capability information of the terminal device, wherein the third resource unit combination is a resource unit combination obtained after the first resource unit is added to the first resource unit combination.

15. The gap-free measurement method according to claim 14, wherein the gap-free measurement method further comprises:
receiving, by the access network device, the capability information from the terminal device, wherein the capability information of the terminal device comprises the resource unit combination supported by the terminal device and a MIMO capability of each resource unit in the resource unit combination supported by the terminal device.

16. The gap-free measurement method according to claim 11, wherein the gap-free measurement method further comprises:
when the radio frequency channels of the first resource unit are some of the radio frequency channels of the second resource unit, receiving or sending, by the access network device, uplink and downlink signals on the second resource unit by using a reduced MIMO capability; or
when the radio frequency channels of the first resource unit are all of the radio frequency channels of the second resource unit, stopping, by the access network device, receiving or sending uplink and downlink signals on the second resource unit.

17. A gap-free measurement apparatus, wherein the gap-free measurement apparatus comprises:
one or more processors; and
one or more memories;
wherein the one or more memories are coupled to the one or more processors, and the one or more memories are configured to store computer program code or computer instructions; and
when the one or more processors execute the computer instructions, the gap-free measurement apparatus is enabled to perform operations comprising:
receiving configuration information from an access network device, wherein the configuration information is used to indicate a terminal device to perform gap-free measurement on a first cell, and the first cell is a neighboring cell of a serving cell of the terminal device;
determining radio frequency channels of a first resource unit based on the configuration information, wherein the first resource unit is a resource unit to be measured in the first cell, wherein the radio frequency channels of the first resource unit are some or all of radio frequency channels of a second resource unit, and wherein the second resource unit is comprised in resource units of a first resource unit combination that is configured for the terminal device and the resources units of the first resource unit combination are in an active state; and
performing gap-free measurement on the first cell on the radio frequency channels of the first resource unit.

* * * * *